(12) United States Patent
Kumar et al.

(10) Patent No.: US 11,295,229 B1
(45) Date of Patent: Apr. 5, 2022

(54) SCALABLE GENERATION OF MULTIDIMENSIONAL FEATURES FOR MACHINE LEARNING

(71) Applicant: Amazon Technologies, Inc., Seattle, WA (US)

(72) Inventors: Pooja Ashok Kumar, Bangalore (IN); Naveen Sudhakaran Nair, Issaquah, WA (US); Rajeev Ramnarain Rastogi, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 804 days.

(21) Appl. No.: 15/132,959

(22) Filed: Apr. 19, 2016

(51) Int. Cl.
*G06N 20/00* (2019.01)
*G06N 7/00* (2006.01)

(52) U.S. Cl.
CPC ............. *G06N 20/00* (2019.01); *G06N 7/005* (2013.01)

(58) Field of Classification Search
CPC ....... G06N 20/00; G06F 16/21; G06F 16/353; G06F 16/84; G06F 16/248; G06F 16/2228; G06F 16/2455; G06F 3/04842; G06F 9/44505; G06F 9/542; G06F 11/00; H04L 41/5074; H04L 41/145
See application file for complete search history.

(56) References Cited

U.S. PATENT DOCUMENTS

| | | |
|---|---|---|
| 6,681,383 B1 | 1/2004 | Pastor et al. |
| 8,229,864 B1 | 7/2012 | Lin et al. |
| 8,429,103 B1 | 4/2013 | Aradhye et al. |
| 2012/0054658 A1 | 3/2012 | Chuat et al. |
| 2012/0191631 A1 | 7/2012 | Breckenridge et al. |
| 2013/0318240 A1 | 11/2013 | Hebert et al. |
| 2016/0092597 A1* | 3/2016 | Hu ....................... G06F 16/9014 707/798 |
| 2017/0228660 A1* | 8/2017 | Kutzkov ................ G06N 20/00 |

FOREIGN PATENT DOCUMENTS

| | | |
|---|---|---|
| JP | 2009282577 | 12/2009 |
| WO | 2012151198 | 11/2012 |

OTHER PUBLICATIONS

Shrivastava ("Probabilistic Hashing Techniques for Big Data", PHD Dissertation, Cornell University, Aug. 2015, pp. 1-176) (Year: 2015).*
Vernica ("Efficient Parallel Set-Similarity Joins Using MapReduce", SIGMOD'10, Jun. 6-10, 2010, pp. 1-11) (Year: 2010).*

(Continued)

*Primary Examiner* — Miranda M Huang
*Assistant Examiner* — Robert Lewis Kulp
(74) *Attorney, Agent, or Firm* — Robert C. Kowert; Kowert, Hood, Munyon, Rankin & Goetzel, P.C.

(57) ABSTRACT

An approximate count of a subset of records of a data set is obtained using one or more transformation functions. The subset comprises records which contain a first value of one input variable, a second value of another input variable, and a particular value of a target variable. Using the approximate count, an approximate correlation metric for a multidimensional feature and the target variable is obtained. Based on the correlation metric, the multidimensional feature is included in a candidate feature set to be used to train a machine learning model.

18 Claims, 12 Drawing Sheets

(56) References Cited

OTHER PUBLICATIONS

Drew ("Strand: Fast Sequence Comparison using MapReduce and Locality Sensitive Hashing", BCB'14, Sep. 20-23, 2014, pp. 1-8) (Year: 2014).*
Lou et al. ("Accurate Intelligible Models with Pairwise Interactions", KDD'13, Aug. 11-14, 2013, pp. 1-9) (Year: 2013).*
Zhang et al. ("Finding Highly Correlated Pairs Efficiently with Powerful Pruning", CIKM'06, Nov. 5-11, 2006, pp. 1-10) (Year: 2006).*
Vernica et al. ("Efficient Parallel Set-Similarity Joins Using MapReduce", SIGMOD'10, Jun. 6-10, 2010, pp. 1-11) (Year: 2010).*
Drew et al. ("Strand: Fast Sequence Comparison using MapReduce and Locality Sensitive Hashing", BCB'14, Sep. 20-23, 2014, pp. 1-8) (Year: 2014).*
Shrivastava et al. ("Probabilistic Hashing Techniques for Big Data", PHD Dissertation, Cornell University, Aug. 2015, pp. 1-176) (Year: 2015).*
Vogel et al. ("Scalable Look-Ahead Linear Regression Trees", KDD'07, Aug. 12-15, 2007, pp. 1-9) (Year: 2007).*
Marius Kloft, et al., "Efficient and Accurate Ip-Norm Multiple Kernel Learning", In Advances in neural information processing systems, 2009, pp. 997-1005.
Pratik Jawanpuria, et al., "Efficient Rule Ensemble Learning using Hierarchical Kernel", In the Proceedings of the 28th International Conference on Machine Learning, 2011, pp. 1-8.
Andrei Z. Broder, "On the resemblance and containment of documents", In the Proceedings of the Compression and Complexity of Sequences, 1997, pp. 1-9.
Jerome H. Friedman, et al., "Predictive Learning Via Rule Ensembles", In the Annals of Applied Statistics, vol. 2, No. 3, Institute of Mathematical Statistics, 2008, pp. 916-954.
Elkebir Sarhrouni, et al., "Application of Symmetric Uncertainty and Mutual Information to Dimensionality Reduction and Classification of Hyperspectral Images", International Journal of Engineering and Technology (IJET), vol. 4, No. 5, Oct.-Nov. 2012, pp. 268-276.
Amazon Web Services, "Amazon Machine Learning: Developer Guide", Nov. 19, 2015, pp. 1-143.
Wikipedia, "MinHash", Retrieved from URL: https://en.wikipedia.org/wiki/MinHash on Feb. 22, 2016, pp. 1-6.
Andrei Z. Broder, et al., "SRC Technical Note: Syntactic Clustering of the Web", Systems Research Center, Jul. 25, 1997, pp. 1-13.
John Langford, "Tutorial", Retrieved from URL: https://github.com/JohnLangford/vowpal_wabbit/wiki/Tutorial on Mar. 28, 2016, pp. 1-13.
Ping Li, et al., "b-Bit Minwise Hashing", ACM, International World Wide Web Conference Committee (WWW 2010), Apri6 26-30, 2010, pp. 1-10.
U.S. Appl. No. 14/489,448, filed Sep. 17, 2014, Leo Parker Dirac.
U.S. Appl. No. 14/489,449, filed Sep. 17, 2014, Leo Parker Dirac.
U.S. Appl. No. 14/484,201, filed Sep. 11, 2014, Michael Brueckner.

* cited by examiner

Table 502 →

| OR-ID | Highest-Degree | Major | Age | Salary |
|---|---|---|---|---|
| | | | | ← Target variable 520 |

Original Data Set

| OR-ID | Highest-Degree | Major | Age | Salary |
|---|---|---|---|---|
| 1 | B | Co | LE30 | LE100K |
| 2 | B | Hi | LE30 | LE100K |
| 3 | M | Bu | GT30 | GT100K |
| 4 | P | Hi | LE30 | GT100K |
| 5 | M | Co | LE30 | GT100K |
| 6 | P | Bu | LE30 | LE100K |
| 7 | B | Co | GT30 | LE100K |
| 8 | B | Hi | GT30 | LE100K |
| 9 | M | Bu | GT30 | GT100K |
| 10 | P | Bu | LE30 | GT100K |
| 11 | B | Hi | GT30 | LE100K |
| 12 | M | Co | GT30 | GT100K |
| 13 | B | Bu | LE30 | LE100K |
| 14 | P | Co | GT30 | LE100K |
| 15 | M | Bu | LE30 | GT100K |

Legend 530

OR-ID: Observation record identifier

Highest – degree: B = Bachelor's, M = Master's, P = PhD

Major: Bu = Business, Hi = History, Co = ComputerScience

Age: GT30 = greater-than-30, LE30 = less-than-or-equal-to-30

Salary (target variable): GT100K = greater-than-100K, LE100K = less-than-or-equal-to-100K

FIG. 5

Table 602

| OR-ID | Original Data Set ||||  Derived Quadratic Features |||
|---|---|---|---|---|---|---|---|
| | Highest-Degree | Major | Age | Salary | Highest-Degree_M ajor | Highest-Degree_A ge | Major_Age |
| 1 | B | Co | LE30 | LE100K | B_Co | B_LE30 | Co_LE30 |
| 2 | B | Hi | LE30 | LE100K | B_Hi | B_LE30 | Hi_LE30 |
| 3 | M | Bu | GT30 | GT100K | M_Bu | M_GT30 | Bu_GT30 |
| 4 | P | Hi | LE30 | GT100K | P_Hi | P_LE30 | Hi_LE30 |
| 5 | M | Co | LE30 | LE100K | M_Co | M_LE30 | Co_LE30 |
| 6 | P | Bu | LE30 | LE100K | P_Bu | P_LE30 | Bu_LE30 |
| 7 | B | Co | GT30 | LE100K | B_Co | B_GT30 | Co_GT30 |
| 8 | B | Hi | GT30 | GT100K | B_Hi | B_GT30 | Hi_GT30 |
| 9 | M | Bu | LE30 | LE100K | M_Bu | M_GT30 | Bu_LE30 |
| 10 | P | Bu | GT30 | LE100K | P_Bu | P_LE30 | Bu_GT30 |
| 11 | B | Hi | LE30 | GT100K | B_Hi | B_GT30 | Hi_GT30 |
| 12 | M | Co | GT30 | LE100K | M_Co | M_GT30 | Co_GT30 |
| 13 | B | Bu | LE30 | LE100K | B_Bu | B_LE30 | Bu_LE30 |
| 14 | P | Co | GT30 | LE100K | P_Co | P_GT30 | Co_GT30 |
| 15 | M | Bu | LE30 | GT100K | M_Bu | M_LE30 | Bu_LE30 |

FIG. 6

Table 702

| OR-ID | Original Data | | | | Hash Values | | | | |
|---|---|---|---|---|---|---|---|---|---|
| | Highest-Degree | Major | Age | Salary | Hash 1 | Hash 2 | Hash 3 | Hash 4 | Hash 5 |
| 1 | B | Co | LE30 | LE100K | 0.782997 | 0.62166 | 0.358347 | 0.390941 | 0.644442 |
| 2 | B | Hi | LE30 | LE100K | 0.84197 | 0.496557 | 0.644606 | 0.236777 | 0.20953 |
| 3 | M | Bu | GT30 | GT100K | 0.13711 | 0.146655 | 0.341775 | 0.5978 | 0.302867 |
| 4 | P | Hi | LE30 | GT100K | 0.496999 | 0.81543 | 0.595452 | 0.810864 | 0.412905 |
| 5 | M | Co | LE30 | GT100K | 0.150861 | 0.352956 | 0.606103 | 0.916083 | 0.137948 |
| 6 | P | Bu | LE30 | LE100K | 0.991147 | 0.841449 | 0.379533 | 0.014943 | 0.73778 |
| 7 | B | Co | GT30 | LE100K | 0.252912 | 0.751189 | 0.787072 | 0.701646 | 0.337217 |
| 8 | B | Hi | GT30 | LE100K | 0.503927 | 0.38203 | 0.975277 | 0.121057 | 0.333535 |
| 9 | M | Bu | GT30 | GT100K | 0.555399 | 0.948523 | 0.928176 | 0.825734 | 0.541544 |
| 10 | P | Bu | LE30 | GT100K | 0.817996 | 0.133882 | 0.017256 | 0.744062 | 0.658646 |
| 11 | B | Hi | GT30 | LE100K | 0.795695 | 0.094412 | 0.724321 | 0.223226 | 0.998498 |
| 12 | M | Co | GT30 | GT100K | 0.531072 | 0.461431 | 0.38817 | 0.023505 | 0.096494 |
| 13 | B | Bu | LE30 | LE100K | 0.97306 | 0.544206 | 0.07875 | 0.179238 | 0.541376 |
| 14 | P | Co | GT30 | LE100K | 0.710667 | 0.457722 | 0.143974 | 0.993131 | 0.080919 |
| 15 | M | Bu | LE30 | GT100K | 0.054315 | 0.37986 | 0.104754 | 0.344528 | 0.810802 |

FIG. 7

Table 802

| LE100K Signatures | Sig 1 | Sig 2 | Sig 3 | Sig 4 | Sig 5 |
|---|---|---|---|---|---|
| Highest-Degree_B | 0.252912 | 0.094412 | 0.07875 | 0.121057 | 0.20953 |
| Highest-Degree_M | N/A | N/A | N/A | N/A | N/A |
| Highest-Degree_P | 0.710667 | 0.457722 | 0.143974 | 0.014943 | 0.080919 |
| Major_Co | 0.252912 | 0.457722 | 0.143974 | 0.390941 | 0.080919 |
| Major_Hi | 0.503927 | 0.094412 | 0.644606 | 0.121057 | 0.20953 |
| Major_Bu | 0.97306 | 0.544206 | 0.07875 | 0.014943 | 0.541376 |
| Age_LE30 | 0.782997 | 0.496557 | 0.07875 | 0.014943 | 0.20953 |
| Age_GE30 | 0.252912 | 0.094412 | 0.143974 | 0.121057 | 0.080919 |

Table 804

| GT100K Signatures | Sig 1 | Sig 2 | Sig 3 | Sig 4 | Sig 5 |
|---|---|---|---|---|---|
| Highest-Degree_B | N/A | N/A | N/A | N/A | N/A |
| Highest-Degree_M | 0.054315 | 0.146655 | 0.104754 | 0.023505 | 0.096494 |
| Highest-Degree_P | 0.496999 | 0.133882 | 0.017256 | 0.744062 | 0.412905 |
| Major_Co | 0.150861 | 0.352956 | 0.38817 | 0.023505 | 0.096494 |
| Major_Hi | 0.496999 | 0.81543 | 0.595452 | 0.810864 | 0.412905 |
| Major_Bu | 0.054315 | 0.133882 | 0.017256 | 0.344528 | 0.302867 |
| Age_LE30 | 0.054315 | 0.133882 | 0.017256 | 0.344528 | 0.137948 |
| Age_GE30 | 0.13711 | 0.146655 | 0.341775 | 0.023505 | 0.096494 |

FIG. 8

Table 902 (number of signature component matches)

| Highest-Degree_Major -> | B_Bu | B_Co | B_Hi | M_Bu | M_Co | P_Bu | P_Co | P_Hi | Total |
|---|---|---|---|---|---|---|---|---|---|
| GT100K | 0 | 0 | 0 | 0 | 1 | 2 | 2 | 0 | 7 |
| LE100K | 1 | 1 | 1 | 3 | 0 | 0 | 1 | 3 | 9 |
| Total | 1 | 1 | 1 | 3 | 1 | 2 | 3 | 3 | 16 |

Table 904 (approximate counts, derived from table 902)

| Highest-Degree_Major -> | B_Bu | B_Co | B_Hi | M_Bu | M_Co | P_Bu | P_Co | P_Hi | Total |
|---|---|---|---|---|---|---|---|---|---|
| GT100K | 0 | 0 | 0 | 0 | 1.5 | 1.714286 | 2 | 0 | 6.071429 |
| LE100K | 1.333333 | 1.5 | 3.375 | 3.375 | 0 | 0.666667 | 1.875 | 0.857143 | 8.75 |
| Total | 1.333333 | 1.5 | 3.375 | 3.375 | 1.5 | 2.380952 | 1.875 | 0.857143 | 14.82143 |

Table 906 (actual counts, obtained from original data)

| Highest-Degree_Major -> | B_Bu | B_Co | B_Hi | M_Bu | M_Co | P_Bu | P_Co | P_Hi | Total |
|---|---|---|---|---|---|---|---|---|---|
| GT100K | 0 | 0 | 0 | 0 | 3 | 2 | 1 | 0 | 7 |
| LE100K | 2 | 1 | 2 | 3 | 0 | 0 | 1 | 1 | 8 |
| Total | 2 | 1 | 2 | 3 | 3 | 2 | 2 | 1 | 15 |

Table 908 (correlation metrics for quadratic features)

| | Approx Symmetric Uncertainty | Actual Symmetric Uncertainty |
|---|---|---|
| Highest-Degree_Major | 0.780934594 | 0.771644905 |
| Highest-Degree_Age | 0.712884364 | 0.717575841 |
| Major_Age | 0.750809215 | 0.844735859 |

FIG. 9

SCALABLE GENERATION OF MULTIDIMENSIONAL FEATURES FOR MACHINE LEARNING

BACKGROUND

As the costs of data storage have declined over the years, and as the ability to interconnect various elements of the computing infrastructure has improved, more and more data pertaining to a wide variety of applications can potentially be collected and analyzed using increasingly sophisticated machine learning algorithms. The analysis of data collected from sensors embedded within airplane engines, automobiles, health monitoring devices or complex machinery may be used for various purposes such as preventive maintenance, proactive health-related alerts, improving efficiency and lowering costs. Streaming data collected from an online retailer's websites can be used to make more intelligent decisions regarding the quantities of different products which should be stored at different warehouse locations, and so on. Data collected about machine servers may be analyzed to prevent server failures. Photographs and videos may be analyzed, for example, to detect anomalies which may represent potential security breaches, or to establish links with other photographs or videos with a common subject matter.

Within the data being collected, a given observation record may comprise values of several different input variables—for example, a record collected from an automobile may include data about the engine temperature, oil pressure, coolant levels, tire pressure, and so on. Many machine learning algorithms are designed to use some combination of the input variables to predict a value for a "target" variable. In the case of the automobile data example, a target variable may comprise something as simple as a yes/no decision as to whether a visit to an automobile mechanic should be scheduled within the next N days. Of course, target variables with more than two possible values may be used for various prediction problems.

For simplicity and ease of implementation, many machine learning models assume that a linear relationship exists between the input variables and the target variables. However, for at least some types of machine learning problems and some data sets, complex or non-linear relationships may exist between the input variables and the target variables, and capturing such relationships in some form in the model may significantly enhance the accuracy of the predictions produced by the model. Unfortunately, many conventional approaches towards modeling of non-linear relationships may not scale, and therefore may not be useful for the extremely large data sets commonly collected today. Data scientists may be left with few attractive choices with respect to capturing such complex relationships. For example, down-sampling the data sets (which may be required to reach the data set sizes which can be handled using non-linear models) may result in the loss of important information. Another approach, involving expanding the data sets by including all the derivable higher-order features (e.g., quadratic features formed by generating combinations of all pairs of the input variables), which could potentially capture underlying non-linear relationships while still using a linear model, may itself result in unsustainable increases in the amount of computation and/or storage required.

BRIEF DESCRIPTION OF DRAWINGS

FIG. 5 illustrates a simple example data set for which a min-wise hashing-based approach towards feature selection may be employed, according to at least some embodiments.

FIG. 6 illustrates examples of derived quadratic features for the simple example data set, according to at least some embodiments.

FIG. 7 illustrates example outputs of a plurality of hash functions with respect to observation records of the simple example data set, which may be used to compute approximate co-occurrence counts, according to at least some embodiments.

FIG. 8 illustrates example signature vectors which may be generated for the quadratic features corresponding to respective values of a target variable of the simple example data set, according to at least some embodiments.

FIG. 9 illustrates examples of approximate co-occurrence counts, actual co-occurrence counts, and correlation metrics derived from the co-occurrence counts for the simple example data set, according to at least some embodiments.

Figure 1:
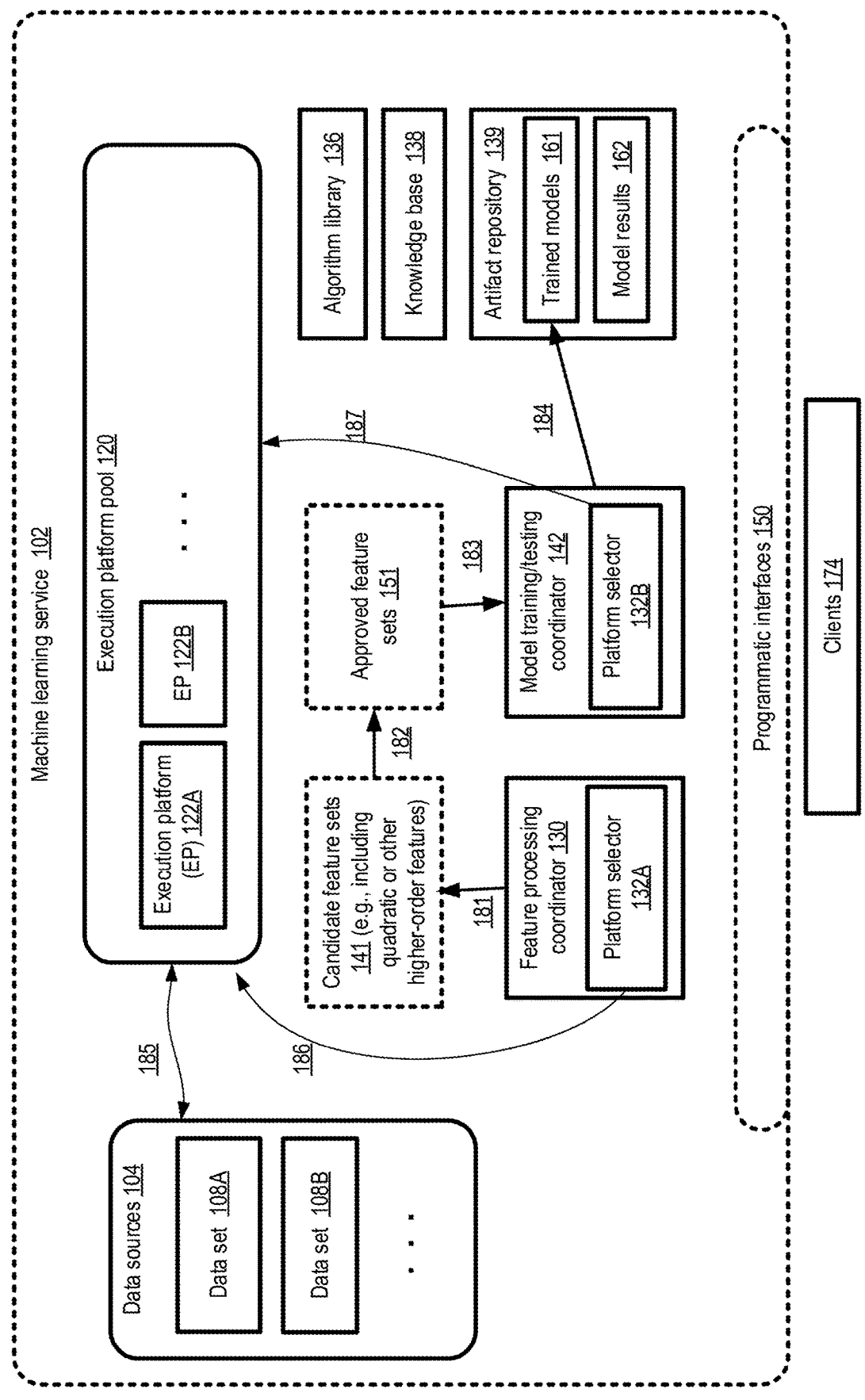
FIG. 1 illustrates an example system environment in which multidimensional features with high predictive utility may be generated efficiently from the input variables of large machine learning data sets, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for scalable generation of multidimensional features for machine learning data sets are described. In at least some embodiments, the scalable feature-generation techniques may be implemented at a machine learning service of a provider network. Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. The resources of a provider network may in some cases be distributed across multiple data centers, which in turn may be distributed among numerous cities, states and countries. In other embodiments, the scalable feature-generation techniques may be implemented at computing devices which are not necessarily associated with, or part of, a network-accessible service or a provider network.

In many cases, a given machine learning data set that is to be used to train a model may include millions of observation records, each of which in turn may comprise hundreds or even thousands of input variables. For a large subset of machine learning problems, the goal of a model is to make predictions of the values of a target variable (sometimes also referred to as an output variable) based on the input variable values. Target variable values may typically be available within at least a subset of the data set which is to be used for training, referred to as the training set. A given observation record of the training set may thus comprise a collection of some number of input variables {ivar1, ivar2, ... ,} and a target variable tvar. In general, the variables of a data set may comprise instances of various data types, such as numerical (integer or real) values, Boolean values, categorical values or text. A categorical variable can take on one of a discrete set of allowed values, such as values taken from the set {male, female} or the set {England, USA, Japan}. The allowed value set may be referred to as the domain of the variable. To simplify the presentation herein, we assume that those variables of the training set which are not originally categorical are converted to corresponding categorical values before the feature exploration techniques described below are initiated. A number of techniques may be used to transform raw non-categorical observation data to obtain categorical variables in different embodiments, such as "binning" numeric values (including real and integer values) into a small number of buckets or "bins", binarizing text such that the presence or absence of a text token is represented by a "1" or a "0", and so on. At least a subset of input variables, target variables, or input as well as target variables may be converted to categorical form during pre-processing in some embodiments.

The input variables (converted to categorical values if required) may also be referred to herein as single-dimensional or unidimensional features, as distinguished from multidimensional or higher-order features which may be obtained by combining the input variables as discussed below. For some data sets and for some kinds of machine learning problems, a linear predictive model which takes only the single-dimensional features into account may be sufficient. That is, a linear combination of the values of some or all of the single-dimensional features (each feature being associated with one or more coefficients identified during the training of the model) of an observation record may be used to predict the value of the target variable with a desired level of accuracy. In many cases, however, the input variables or single-dimensional features may not be sufficient—for example, a quadratic feature formed by combining two input variables may be more useful for predicting the target variable than some or all of the input variables taken individually. Such scenarios may arise, for example, when there is a complex non-linear relationship between some combination(s) of the input variables and the target variable, which cannot be captured sufficiently accurately in a linear equation of individual input variables. In order to generate predictive models with a desired level of accuracy for data sets which represent non-linear relationships, combinations such as quadratic features, three-variable features, etc., may have to be evaluated with regard to their predictive utility to at least some degree. The terms "higher-order features" and "multidimensional features" may be used synonymously herein to refer to features formed by combining the values of two or more input variables.

Consider one simple example, in which the high-level goal of a machine learning model is to predict something about the salary level of an employee, based on factors such as the highest graduate or post-graduate degree obtained by the employee, the subject or "major" in which the degree was obtained, and the age of the employee. It may turn out to be the case that instead of a linear combination of these three input variables, a better predictor of the salary level may comprise the combination of the degree and the subject. Thus, for example, a combination of a Master's-level degree and a Business major may be more highly correlated with a higher salary level than the Master's-level degree alone, or a Business major alone. In such a scenario, expanding the data set by adding a new derived quadratic feature to each observation record, where the derived feature quadratic for a given observation combines the values of the degree and major input variables, may be advisable. After the data set has been expanded with the quadratic feature, a linear model may be constructed, which may have the benefits of scalability associated with linear models in general, and may also capture the non-linear relationship between the degree, the major and the salary range.

In many cases, discovering informative multidimensional features (e.g., higher-order features whose inclusion in a linear model's input feature set is likely to lead to higher-quality predictions) may involve obtaining the values of correlation metrics between the multidimensional features and the target variable. Computing such correlation metrics may in turn involve obtaining occurrence counts for each combination of (a) a value of the multidimensional feature and (b) a value of the target variable. Such occurrence counts, associated with matched combinations of values of different variables/features, may also be referred to as co-occurrence counts. For data sets comprising hundreds or thousands of input variables, the cardinality of the set of feasible multidimensional features may become extremely high, even if the maximum number of features to be combined at a time is limited to two or three. As a result, computing the co-occurrence counts may require substantial computational effort. The complexity of obtaining the occurrence counts with respect to quadratic features alone on a data set may be quadratic in the number of features and linear in the number of observations. As a result, the resource requirements for identifying useful multidimensional features using an exhaustive approach may be too high for practical implementations.

Accordingly, in at least some embodiments, a technique involving the use of a min-wise hashing algorithm to obtain approximate occurrence counts and corresponding approximate correlation metrics may be employed. At a high-level, the technique may comprise two stages of analysis and may be summarized as follows. In a first stage, a candidate feature set comprising a selected subset of multidimensional features may be constructed efficiently using min-wise hashing. During this phase, multidimensional features which are unlikely to be highly correlated with the target variable may be discarded from further consideration. The candidate feature set members to be retained for further evaluation may be selected using approximate occurrence counts which rely on the set-similarity-detection capabilities of min-wise hashing algorithms. For some data sets, it may even be the case that some number single-dimensional features are eliminated from further consideration during the first stage. After the candidate feature set (which may at least in some cases be far smaller than the exhaustive set of feasible features) is identified, an exact calculation of occurrence counts and/or corresponding correlation metrics may be performed on the candidate features in the second stage of analysis. A final approved feature set which can be used to train a linear model may be obtained based on the results of these exact calculations. It may sometimes be the case that all the candidate features are found to be correlated highly enough with the target variable that they are retained in the approved feature set. In other cases, one or more of the candidate features identified using the approximate analysis of the first stage may be found (via exact analysis) to be less correlated with the target variable than suggested by the approximate analysis, and such candidate features may be discarded from the approved feature set. In most cases, the candidate feature set identified using approximate analysis (and hence the approved feature set derived from the candidate feature set) may include enough highly-correlated features to train models with the desired level of prediction accuracy. Of course, due to the approximate and probabilistic nature of the analysis, it may sometimes be the case that one or more multidimensional features which could have high predictive utility are not included in the candidate feature set. Several approaches may be taken to increase the probability that highly-correlated multidimensional variables are not left out of the candidate feature set in different embodiments, as described below in further detail.

The net result of the two-stage analysis may be a substantial reduction in the amount of resources consumed (and therefore the time taken) to identify a feature set with high predictive utility for linear models for at least some data sets, compared to the approach of computing exact occurrence counts and correlations for all possible quadratic and/or other high-order features. A number of different types of models may be trained using the approved feature sets in various embodiments, including binary classification models and multi-class classification models. In at least one embodiment a regression model may also be trained using at least some multidimensional features selected using the min-wise hashing approach. In some embodiments, the features identified using min-wise hashing may be used to train non-linear models; that is, the use of the algorithm described herein is not necessarily restricted to linear models. In at least one embodiment, the candidate and/or approved feature sets may be used, at least initially, primarily to provide insights into the data sets being analyzed—e.g., the min-wise hashing-based technique may be used to better understand relationships within the data, and may not necessarily be used to train models.

According to one embodiment, a data set to be used to train a machine learning model may be identified, e.g., in response to a client's model generation request submitted to a machine learning service. The data set may include numerous observation records, each including some number of input variables and a target variable. Using signatures obtained by applying a plurality of hash functions (or other similar transformation functions) to the observation records, approximate population counts for various subsets of the data set may be determined, where the member observation records of each subset meet a particular co-occurrence criterion. The signatures may be obtained by determining the minimum value from among the hash values output for observation records in which a particular input variable has a first value and the target variable has a second value; this is why the technique may be referred to as "min"-wise hashing. The co-occurrence criterion may refer to particular combinations of values of a plurality of input variables (hence the use of the phrase prefix "co" in co-occurrence) and the target variable. For example, consider a scenario in which one input variable ivar1 can have the values v1 or v2, another input variable ivar2 can have the values v3 or v4, the target variable tvar can have the values t1 and t2, and only quadratic combinations of input variables are being considered. One subset of records for which an approximate population count is found may include those records in which ivar1=v1, ivar2=v3, and tvar=t1. A second subset for which an approximation population count is found may include those records which meet the co-occurrence criterion ivar1=v1, ivar2=v4, and tvar=t1, a third subset may include those observations in which ivar1=v1, ivar2=v3 and tvar=t2, and so on. The approximate population counts may be determined at least in part by counting matching elements among the signatures generated earlier. Details of the kinds of computations involved in various phases of the analysis are perhaps most easily understood with the help of concrete examples. A trivial example with a small number of observations and input variables is therefore provided later in this document.

Using these approximate population counts, approximate values of a correlation metric between various multidimensional features (formed by the combinations of the input variables whose co-occurrence was taken into account in estimating the population counts) and the target variable may be obtained. Any of a number of different correlation metrics, such as symmetric uncertainty or other types of mutual information metrics, Gini impurity metrics, information gain metrics etc. may be used in different embodiments. Then, these approximate correlation values may be used to select those multidimensional features which meet a first correlation threshold criterion. For example, only those multidimensional features whose approximate symmetric uncertainty exceeds SUthreshold1 may be selected, while those multidimensional features which have an approximate symmetric uncertainty value less than or equal to SUthreshold1 may be rejected. The selected metrics may be included in a candidate feature set.

The candidate feature set may be evaluated further in at least one embodiment, e.g., by computing exact rather than approximate population counts and exact rather than approximate correlation metrics with respect to the target variable. Those candidate feature set members which meet a second correlation threshold criterion SUthreshold2 may be retained in an approved feature set. The approved feature set may be used to train a linear model. In at least some embodiments, the values of SUthreshold2 and/or SUthreshold1 may be selected based on the contents of a knowledge base entry—e.g., an entry which indicates a range of thresholds which were found effective, in previous feature exploration attempts, at selecting useful features for data sets with similar properties as the data set being analyzed. In at least one embodiment, the threshold used for identifying candidate features (SUthreshold1) may differ from the threshold used for identifying the final set of approved features (SUthreshold2). For example, a more stringent criterion may be used to select the members of the approved feature set than was used to identify candidate features using approximate population counts in one embodiment. In some embodiments, the second analysis phase may not be performed—e.g., those features which are identified as candidates via the approximation techniques may simply be used to train a model. For some problem domains, while it may be acceptable to use (potentially, a large set of) candidates to train a model without performing the second phase of the analysis, it may still be worthwhile to take measures to deal with multi-dimensional features which may not be especially high in predictive value. In some such scenarios, appropriate regularization techniques (such as ridge regression, Lasso, elastic net, or the like) may be used to minimize the impact of noisy or less-useful multi-dimensional features included among the candidates. In at least one embodiment, a different correlation metric may be used at the candidate selection stage than is used in the exact analysis for identifying the final or approved feature set.

In at least some embodiments, when pruning the features, either at the candidate selection stage or at the final approval stage, one or more of the input variables themselves may be discarded if their correlation metrics with respect to the target fail to meet the appropriate threshold. When ranking the features relative to one another, in such embodiments features of several different orders (e.g., unidimensional features or input variables, quadratic features, three-variable features, etc.) may be treated equivalently—that is, the decision as to whether a feature is retained or discarded may be independent of the number of input variables from which the feature is derived.

In various embodiments, the hash functions (or other transformation functions) used to generate the signatures may be selected based on their statistical properties. For example, in one embodiment the size of the set of unique output values produced by a given hash function may be required to be no smaller than the size of the data set, so that in general each observation record is mapped to a unique value by a given hash function. In at least one embodiment in which one or more pseudo-random number generators are used for generating hashes, unique seeds and/or other initialization parameters may be required for each hash function, so that for example the set of output values produced by two different hash functions is not correlated. The errors in the approximations may be at least somewhat related to the number of hash/transformation functions used, so the number of functions used for the signatures may be selected in some embodiments based on desired maximum error thresholds. In other embodiments, the number of hash functions used (which may be proportional to the amount of computations performed for signature generation) may be selected based at least in part on the computation capacity available.

In some embodiments, variations of the primary hashing-based algorithm described above may be used to identify candidate feature sets. For example, b-bit min-wise hashing may be employed in some embodiments, in which b-bit subsets of the results produced by applying hash functions are used for the signatures, potentially resulting in substantial memory or storage savings. In one embodiment, locality sensitive hashing may be used. In at least one embodiment, instead of generating K hash values for a given observation record using K hash functions, and then picking the K minimum hash values corresponding to a given multidimensional feature as a signature, a single hash function may be applied to each record, and the K smallest hash values produced by that single hash function may be used as a signature. In the latter approach, a plurality of hash functions may not be required for the candidate set generation phase.

Several of the operations performed in the overall process of identifying the set of informative features to be used to train the model may be well suited for parallelization. In at least some embodiments, the computations involved in signature generation may be distributed among a plurality of execution platforms or servers. The data set may be partitioned either horizontally (in which case each partition includes some number of complete observation records smaller than the total number of observation records) or vertically (in which case each partition includes a projected sub-group of variables for all the observation records). Signatures for each partition may be generated in parallel at respective execution platforms, and the results may be combined at one selected platform (e.g., either a particular one of the platforms used for one of the partitions, or a separate central aggregator platform) to obtain the full-data-set signatures which can be used for the correlation estimation phase. The correlation estimations may also or instead be performed in parallel in some embodiments. For example, the set of different multidimensional features may be subdivided into groups, and the correlation estimation may be performed for each group of features at a respective execution platform in parallel. The approximate correlation metrics generated at each execution platform may be combined at a selected platform to produce the final candidate list. Similarly, operations of the exact correlation calculation may also be performed in parallel at several different execution platforms in at least some embodiments.

In some embodiments in which the techniques discussed above are performed at a machine learning service, a client of the service may utilize a programmatic interface (e.g., an application programming interface or API, a web-based console, a command-line tool, a graphical user interface, or the like) to submit a feature exploration request indicating a set of parameters or preferences which may guide the selection of feature sets for a given data set. The term "feature exploration", as used herein, may refer to operations that may be performed with respect to a given data set to identify and/or generate the particular set of features which are to be used as input to train a model from the data set. Feature exploration may sometimes (but not necessarily always) result in the inclusion of new multidimensional features which were not present in the data set initially. In addition to indicating the source of the data set for which feature exploration is to be performed, in at least some embodiments the feature exploration request may include parameters such as (a) the maximum number of features to be combined when considering multidimensional features, (b) the maximum number of execution platforms to be used at various stages of the analysis, (c) a budget constraint for feature exploration (or for feature exploration as well as training the model), and so on. The budget constraint may be expressed in terms of resource usage units (such as CPU minutes or hours of machine time) and/or in actual currency units in some embodiments.

Example System Environment

FIG. 1 illustrates an example system environment in which multidimensional features with high predictive utility may be generated efficiently from the input variables of large machine learning data sets, according to at least some embodiments. As shown, system 100 comprises a variety of resources of a machine learning service 102 which may in some cases be part of a provider network's suite of services. Machine learning service 102 may include an execution platform pool 120 comprising a plurality of hardware and/or software execution platforms (EPs) 122 (such as EP 122A and EP122B) which may be deployed singly or in groups to perform various types of computations. In the depicted embodiment, the machine learning service 102 may also comprise a collection of data sources 104 from which various data sets 108, such as data set 108A or 108B, may be accessed. In some cases, the output produced by analyzing or processing a given data set at pool 120 may itself form a data set for some other machine learning task, as indicated by the double arrow 185.

In the embodiment shown in FIG. 1, the machine learning service 102 also comprises a feature processing coordinator 130, a model training/testing coordinator 142, an algorithm library 136, a knowledge base 138, and an artifact repository 139 within which artifacts such as trained models 161, model results 162 and the like may be stored. The machine learning service may implement programmatic interfaces 150 to enable clients 174 to submit requests for various machine learning tasks, receive results obtained as a result of the implementation of those tasks, and so on. Any of a variety of interface types may be supported in different embodiments, such as APIs, web-based consoles, command-line tools or graphical user interfaces.

Using the programmatic interfaces 150, a client 174 may submit an implicit or explicit request to identify a set of features to be used to train a model using a specified data set 108 in the depicted embodiment. The request may be implicit in some cases, in that the client may simply request the generation or creation of a predictive model for a target variable of the data set 108, without specifically indicating that multidimensional features should be evaluated. The administrative components of the machine learning service, such as the feature processing coordinator 130 or the model training coordinator 142 may in some cases determine, in response to receiving such a request and performing a preliminary analysis of at least a portion of the data set, that an evaluation of multidimensional features is appropriate. In other cases an explicit feature exploration request may be submitted, e.g., comprising the logical equivalent of the request "please determine which, if, any quadratic or other multidimensional features should be generated to help develop a linear model with a high level of predictive accuracy for data set 108A". Parameters such as a target budget constraint (expressed in any of various units such as resource usage, elapsed time, a currency, or the like), the types of multidimensional features to be considered, parallelism parameters for one or more phases of the analysis, and so on, may be included in the explicit or implicit request.

For at least some data sets 108, the feature processing coordinator 130 may initiate a multi-stage feature exploration procedure in response to the client request. The feature processing coordinator may also be referred to as a feature engineering coordinator or a feature exploration coordinator in some environments. In some cases, one or more variables of the data set (which may include the input variables and/or the target variable) may first be converted from non-categorical variables to categorical variables, e.g., using binning, text binarization and the like. After the conversion to categorical values (if such a conversion is required) is performed, the multi-stage feature exploration may be started. In a first stage, a min-wise hashing technique may be employed to determine (using signatures generated from the data set with the help of a selected plurality of hash functions) approximate co-occurrence counts for various combinations of input variable values and target variable values. Details of the min-wise hashing-based algorithm are provided below, together with a simple example illustrating steps of the algorithm. The various combinations may correspond to quadratic features (derived from two distinct input variables), three-variable features, or other multidimensional features. The approximate co-occurrence counts may then be used to determine corresponding approximate correlation metrics (such as symmetric uncertainty or other mutual information metrics) for the various multidimensional features and the target variable. A candidate feature set 141 comprising some number of features whose approximate correlation metrics meet a first criterion may be generated for the data set 108, as indicated by arrow 181. The set of execution platforms 122 used for generating the candidate feature set may be selected by a platform selector subcomponent 132A of the feature processing coordinator 130 in the depicted embodiment, as indicated by arrow 186.

Depending on the number of input variables of the data set, the candidate feature set 141 may be much smaller than the total number of features which could potentially be derived from the input variables. As such, sufficient resources may be available to perform an exact calculation of co-occurrence counts (and correlation metrics) for the members of the candidate feature set 141. The correlation metrics computed in this second stage may then be used to obtain an approved feature set 151 from the candidate feature set as indicated by arrow 182. From among the candidate features identified using the approximate techniques of the first stage, those features whose exact correlation counts meet an approval threshold criterion may be retained in the approved feature set 151 in at least some embodiments. The set of execution platforms selected for computations needed for the exact correlation values (which may differ from the set of execution platforms used for the approximate co-occurrence counts and correlation value computations) may also be identified by platform selector 132A in the depicted embodiment. In at least one embodiment, the correlation metric used for obtaining an approved feature set 151 may differ from the correlation metric used for obtaining the corresponding candidate feature set 141.

The approved feature set 151 for the data set 108 may be obtained by the model training/testing coordinator 142 in the depicted embodiment. A set of execution platforms 122 to be used to train a liner model using the approved feature set 151 may be identified by platform selector 132B (as indicated by arrow 187), and the model may be trained using an algorithm obtained from library 136. The model may be tested using a subset of the observation records which were not used for training. The model itself, as well as results obtained from the model on test/evaluation data sets or new data sets may be stored in artifact repository 139, as indicated by arrow 134. In some cases, the model produced using the approved feature set may not necessarily meet a desired prediction accuracy criterion. In such a scenario, the model may be re-trained, e.g., using a different feature set or a different input data set. The process of feature exploration may itself be repeated in some cases for a given data set, e.g., if the model produced using a given approved feature set is found to be inadequate. For example, the thresholds used for selecting candidate features and/or approved features may be modified, more hash functions may be used, or other parameters may be modified for each new iteration of feature exploration. Depending on the applicable time and/or resource constraints, more or fewer execution platforms may be deployed in successive iterations of feature exploration.

In at least some embodiments, if sufficient resources are available, one or more techniques may be used proactively to try to increase the probability that the candidate features identified using min-wise hashing include most or all highly-predictive multidimensional features. For example, multiple iterations of the algorithm may be implemented, with different hash functions (or different seeds for pseudo-random number generators used for the hash functions) used for the respective iterations, and the union (or the intersection) of the candidate feature sets identified in each iteration may be calculated to form an overall candidate feature set before the exact correlation analysis is performed. Alternatively, in some embodiments in which a default number of hash functions would typically be used, a larger number of hash functions may be employed (e.g., in combination with relaxing the correlation-based selection thresholds somewhat) in an effort to identify as many high-predictive-utility features as possible.

Entries of knowledge base 138 may indicate feedback and experiences accumulated over time with respect to feature exploration and model training/testing in the depicted embodiment. The knowledge base entries may be generated by internal components of the service 102, and/or by clients 174. In some embodiments parameters to be used to implement feature exploration (such as the appropriate degree of parallelism for various stages of the algorithms, the manner in which the data set should be partitioned for parallel computations, etc.) may be selected by the feature processing coordinator 130 based at least in part on knowledge base entries. It is noted that at least in some embodiments, a machine learning service may not necessarily be utilized to perform feature exploration operations of the kind described above. Instead, a standalone server or a collection of servers unaffiliated with a machine learning service may be used.

Overview of Feature Set Generation

Figure 2:
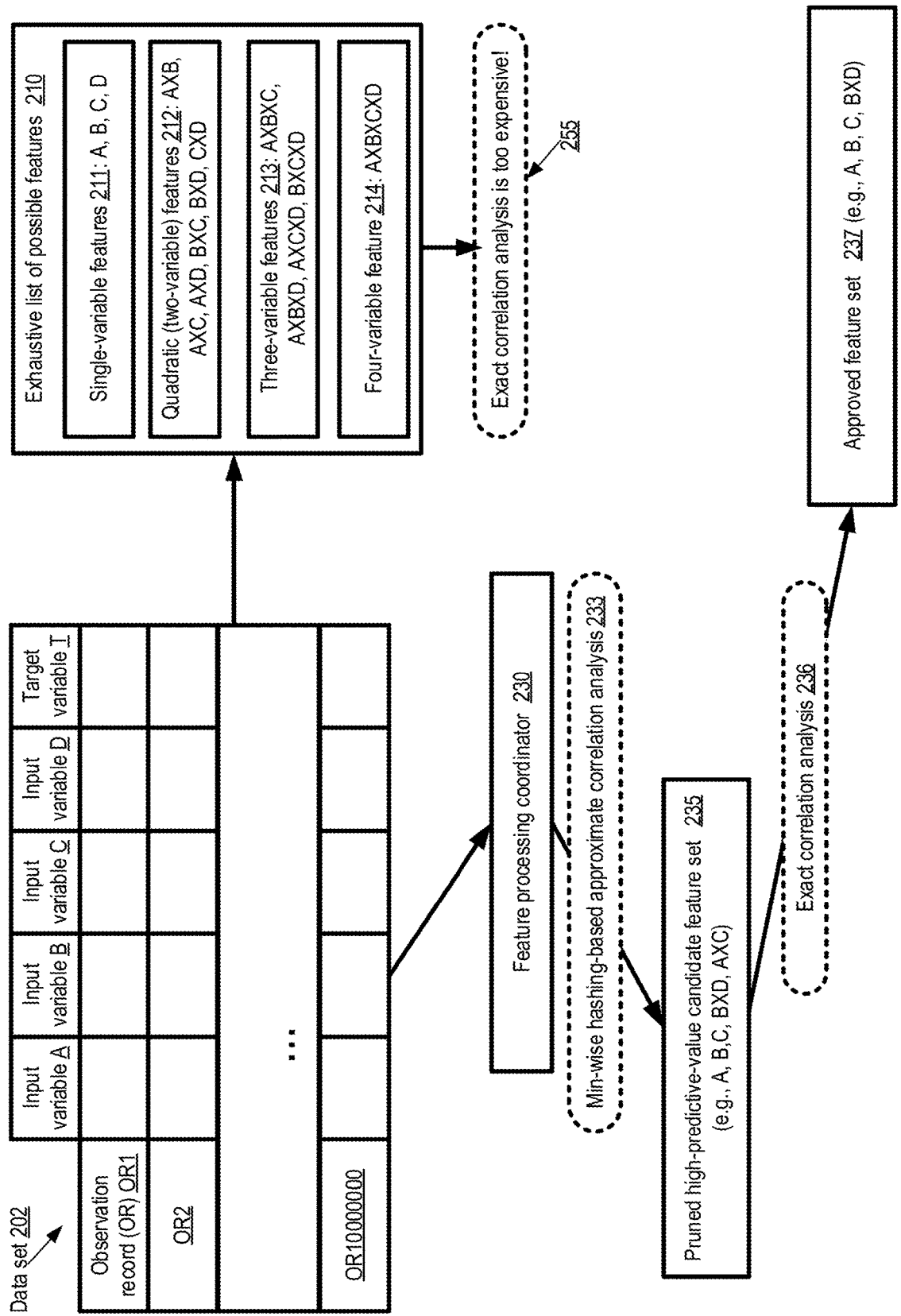
FIG. 2 illustrates an overview of a multi-phase feature exploration technique which may be employed for a linear machine learning model, according to at least some embodiments.

FIG. 2 illustrates an overview of a multi-phase feature exploration technique which may be employed for a linear machine learning model, according to at least some embodiments. Example data set 202, which is to be used to train a model, comprises ten million observation records labeled OR1-OR10000000. Each observation record comprises four input variables A, B, C and D, and a target variable T. Some combinations of the input variables A, B, C and D may be highly correlated with the target variable, but which specific combinations are highly correlated may not be known at the start of the feature exploration. The exhaustive list 210 of possible features which can be derived from the input variables (including the input variables, considered singly, themselves) comprises a total of fifteen features: the four single-variable features 211, six two-variable or quadratic features 212 {A×B, A×C, A×D, B×C, B×D, C×D (where the symbol × is used to denote the combination of the two input variables on either side of the ×)}, four three-variable features 213 {A×B×C, A×B×D, A×C×D and B×C×D} and one four-variable feature 214 {A×B×C×D}. The total number of possible features is reasonably small in the example shown in FIG. 2, since there are only four input variables; it is evident that the total number may be far larger with more realistic data sets which may contain hundreds or thousands of input variables. In general, if the number of input variables is N, $(2^N-1)$ features may be possible—that is, the total number of feasible features may grow exponentially with respect to the input variable count. In order to determine which features, among the exhaustive list of possible features, should be included in the input features used to train a linear model, in a naïve approach respective exact correlation metrics may have to be computed for all the features. This may in turn require the exact co-occurrence counts for all combinations of distinct values for all the input features and the distinct values of the target variable T. This approach, however, may be computationally intractable (at least for more realistic data sets), as indicated in element 255.

Instead, a two-phase technique based on efficient hashing-based approximations may be used in the depicted embodiments to select a useful set of features (i.e., a smaller set of features than shown in list 210 that are likely to be the most highly-correlated with the target variable T). In the first phase, feature processing coordinator 230 may perform min-wise hashing-based approximate correlation analysis 233, resulting in the identification of a pruned high-predictive-value candidate feature set 235. Candidate feature set 235 may comprise one or more single-variable features, such as A, B and C as shown in the illustrated example, as well as one or more multidimensional features, such as B×D and A×C. The candidates may be selected based on their high (approximate) correlations with respect to the target variable T; other candidates from list 210 may be discarded on the basis of low (approximate) correlations with T. In the second phase of the technique, the candidate features of set 235 may be subjected to an exact correlation analysis 236, in which the hashing-based approximation approach of the first phase is not used. The exact correlation values determined for the candidate features may in some cases be used to further prune the candidate features, resulting in an even smaller final approved feature set 237. In the depicted example, the approved feature set includes only A, B, C and B×D; A×C has been pruned as a result of the exact correlation analysis.

Rationale for Using Min-Wise Hashing

At a high level, the objective of feature exploration in the presence of possible non-linear relationships between input variables and target values of a data set is to identify combinations of variables which are highly correlated with, and therefore likely to be helpful for predicting, the target variable (if any such combinations exist). To understand why min-wise hashing may be helpful in making such feature exploration more efficient, it may be helpful to begin with a discussion of correlation with respect to single input variables or unidimensional features. The detailed discussion of the rationale in this section of the document is then extended to quadratic features. A brief discussion of extensions of the basic algorithms used for quadratic features to three-variable and other higher-order features is also provided below.

One example of a correlation metric which may be used in at least some embodiments is symmetric uncertainty; other metrics such as different types of mutual information metrics may be employed in other embodiments. In order to compute the exact symmetric uncertainty U(f, T) with respect to a single input variable or feature f and a target variable T, three entropy values H(f), H(T) and H(f,T) may have to be computed, which in turn require the computation of the probabilities shown in equations E1.1, E1.2 and E1.3 of equation set E1. In these equations, N is the total number of observations, $N_u$ is the count of observations in which the unidimensional feature f has the value u, $N_t$ is the count of observations in which the target variable T has the value t, and $N_{tu}$ is the count of observations in which the target variable has the value t and the feature f has the value u. Equation E1.4 indicates a general formula for computing the entropy H(v) of a given feature v; the summation in equation E1.4 is over all values in the domain of v. Finally, equation E1.5 provides the formula for the exact symmetric uncertainty U(f, T) (also termed the symmetric uncertainty gain ratio) with respect to f and T.

Equation Set E1:

$$P_u = \text{Prob}(f=u) = N_u/N \qquad \text{E1.1}$$

$$P_t = \text{Prob}(T=t) = N_t/N \qquad \text{E1.2}$$

$$P_{tu} = \text{Prob}(f=u, T=t) = N_{tu}/N \qquad \text{E1.3}$$

$$H(v) = -\Sigma_{v \in domain(v)}(P_v \log(P_v)) \qquad \text{E1.4}$$

$$U(f,T) = 2(H(f) + H(T) - H(f,T))/(H(f) + H(T)) \qquad \text{E1.5}$$

Equation set E1 can be extended to obtain the symmetric uncertainty for a quadratic feature f1×f2 by replacing (a) f by f1×f2 in equation set 1 and (b) u by uv where u and v are the respective values of features f1 and f2. The modified version of E1.3 becomes $$P_{tuv} = \text{Probability}(f1=u, f2=v, T=t) = N_{tuv}/N \qquad \text{E1.3b}$$

In equation E1.3b, $N_{tuv}$ is the count of observation records in which the target variable T has the value t, f1 has the value u, and f2 has the value v. Computing the counts $N_{tuv}$ for all combinations of t, u and v is the most expensive task in the calculations of the correlation metric; the remaining counts needed for equation set E1 can be obtained fairly efficiently (e.g., in linear time). Min-wise hashing allows an approximation $N'_{tuv}$ for $N_{tuv}$ (and hence an approximation of symmetric uncertainty) to be obtained with much less computation than is required for the exact computation.

In min-wise hashing, K hash functions $g_1, \ldots, g_K$ may be chosen, each of which uniformly maps a given observation record r to a value in a range which is no smaller than the total number of observation records. Using the hash functions, a K-dimensional min-hash signature $h_1(u,t), h_2(u,t), \ldots, h_K(u,t)$ is obtained for each value-target combination (u, t), where the kth component of the signature for a given (u, t) combination is the lowest value of the hash values among all observations in which the combination is present. That is, $h_k(u,t) = \min(g_k(r)$ for all r).

With the help of the formula for the Jaccard similarity coefficient between two sets, it can be shown that, with respect to a given quadratic feature f1×f2, with f1=u and f2=v, equation E2.1 below can be used for probability p that the min-hash signatures elements $h_k(u,t)$ and $h_k(v,t)$ are equal to one another.

$$p = \text{Prob}(h_k(u,t) = h_k(v,t)) = N_{tuv}/(N_{tu} + N_{tv} - N_{tuv}) \qquad \text{E2.1}$$

Rearranging E2.1, it becomes possible to determine $N_{tuv}$ (which, as discussed above, is the count whose calculation is the most resource-intensive among the calculations required for determining the symmetric uncertainty of the quadratic features) using the following equation:

$$N_{tuv} = (Kp)(N_{tu} + N_{tv})/(K + Kp) \qquad \text{E2.2}$$

// here, Kp is the product of K,
// (the number of hash functions) and p,
// the probability of matching min-hash signature elements shown in equation E2.1

With K-dimensional min-hash signatures, the probability p can be approximated as $K_{tuv}/K$, where $K_{tuv}$ is the number of matching signature elements for a given combination of t, u and v. Therefore, using the approximation ($p = K_{tuv}/K$) and rearranging E2.1, the approximate value $N'_{tuv}$ (approximating the true value $N_{tuv}$) can be obtained by the following equation E2.2:

$$N'_{tuv} = (K_{tuv})(N_{tu} + N_{tv})/(K + K_{tuv}) \qquad \text{E2.3}$$

Using these approximate counts for $N_{tuv}$, an approximate symmetric uncertainty metric (or other correlation metrics) can be obtained for quadratic features, and these approximate metrics can be used to select a set of candidate quadratic features. The error in the approximation may be dependent on K—that is, the more hash functions used, the lower the error is likely to be. The quantities on the right hand side of equation E2.3 can be computed very efficiently (e.g., the signatures can be obtained in a single pass through the data set, and the signature match counts can then be obtained cheaply from the signatures). Pseudo-code for an algorithm for identifying candidate quadratic features (represented by the function GetCandidateQuads) using the rationale discussed in this section is provided below.

//Start of pseudo-code for identifying candidate quadratic features
GetCandidateQuads(S, $\tau_1$, g)
// S is the training data set, $\tau_1$ is a threshold, and g is a set of K selected hash functions $g_1$ through $g_K$
// initialize K-dimensional signatures for all combinations of distinct input variable values u and all distinct target variable values t
1. For all k from 1 to K, set $h_k(u,t) = \infty$
// examine each observation record, updating signatures using the lowest hash output found thus far for matching u and t values
2. For each observation record r in S do {
3. set $h_k(u,t)$ to the minimum of $\{h_k(u,t), \min(g_k(r))\}$ for each matching u and t in r
4. } end for
// at this stage, the min-hash values for the entire data set have been computed
// initialize an empty set of candidate quadratic features
5. Set candidate_quads to the null set
6. For each feasible quadratic feature f1×f2 do {
7. set N' to 0
8. for each distinct value combination (u,v) of f1×f2 and each value of t do {
9. compute $K_{tuv}$, the number of matches in signatures $h_k(u,t)$ and $h_k(v,t)$;
10. obtain approximate co-occurrence count $N'_{tuv}$ from $K_{tuv}$ using equation E2.3
11. set N' to (N'+$N'_{tuv}$)
12. } end for
13. compute approximate symmetric uncertainty U' for f1×f2 and T
using equation Set E2, replacing N by N' and $N_{tuv}$ by $N'_{tuv}$
14. if U' >= $\tau_1$, add f1×f2 to candidate_quads.
15. } end for
16. return candidate_quads
//End pseudo-code for identifying candidate quadratic features Pseudo-code for a complete algorithm SelectUsefulQuadFeatures which uses GetCandidateQuads to select a candidate set of the feasible quadratic features which are likely to have high predictive utility, and then computes the exact correlation metrics for the pruned candidates, is shown below.

//Start of pseudo-code for complete algorithm for selecting useful quadratic features
SelectUsefulQuadFeatures(S, $\tau_1$, $\tau_2$, g)
// $\tau_1$ and g are parameters used in GetCandidateQuads
// $\tau_2$ is another threshold, which may be more stringent than $\tau_1$
// get candidate quadratic features using min-wise hashing
1. candidate_quads = GetCandidateQuads(S, $\tau_1$, g)

// process data set to obtain exact counts for Ntuv for the candidates
2. GetExactCounts(S, candidate_quads)
// Set approved quadratic features to the null set
3. Set approved_quads to the null set
4. for each candidate quadratic feature f1×f2 {
    // Use $N_{tuv}$ values and equation set E1 to obtain exact symmetric uncertainty values
5.  compute exact symmetric uncertainty U(f1×f2,T)
6.  if U(f1×f2,T)>=$\tau_2$ add f1×f2 to approved_quads
7. } end for
8. return approved_quads
//End pseudo-code for complete algorithm Extension to Higher-Order Features The above approach taken for quadratic features, illustrated using the SelectUsefulQuadFeatures and GetCandidateQuads algorithms, may be extended to higher-order features in various embodiments. For example, consider a higher order feature generated by combining three individual features a, b and c. The probability p of min-wise signatures matching for all three features is equal to the ratio of the count of intersections or matches between the three features and the count of their union (this ratio is known as the Jaccard similarity coefficient, which was also used for deriving equation E2.1 above for quadratic features).

$$p = \frac{|a \cap b \cap c|}{|a \cup b \cup c|} \quad \text{E 3.1}$$

The denominator of the fraction shown in E3.1 can be replaced by |a|+|b|+|c|−|a∩b|−|b∩c|−|a∩c|+|a∩b∩c|. The estimated occurrence counts of the resulting feature, |a∩b∩c|, can be obtained by rearranging the above equation as follows:

$$|a \cap b \cap c| = \frac{p}{(1-p)}(|a| + |b| + |c| - |a \cap b| - |b \cap c| - |a \cap c|) \quad \text{E 3.2}$$

The exact values for |a|, |b| and |c| may be obtained by examining the data set, and values for |a∩b|, |b∩c| and |a∩c| may be estimated using the min-wise hashing approach described above for quadratic features. Then, the approximate correlation metrics can be obtained using the approximate counts for |a∩b∩c|. Similarly, approximate occurrence counts for quadruples (four-feature-combinations) may be obtained by using the exact counts of individual features, estimated counts of all possible pairs and triplets of the features involved, and so on.

Methods for Feature Set Selection

Figure 3:
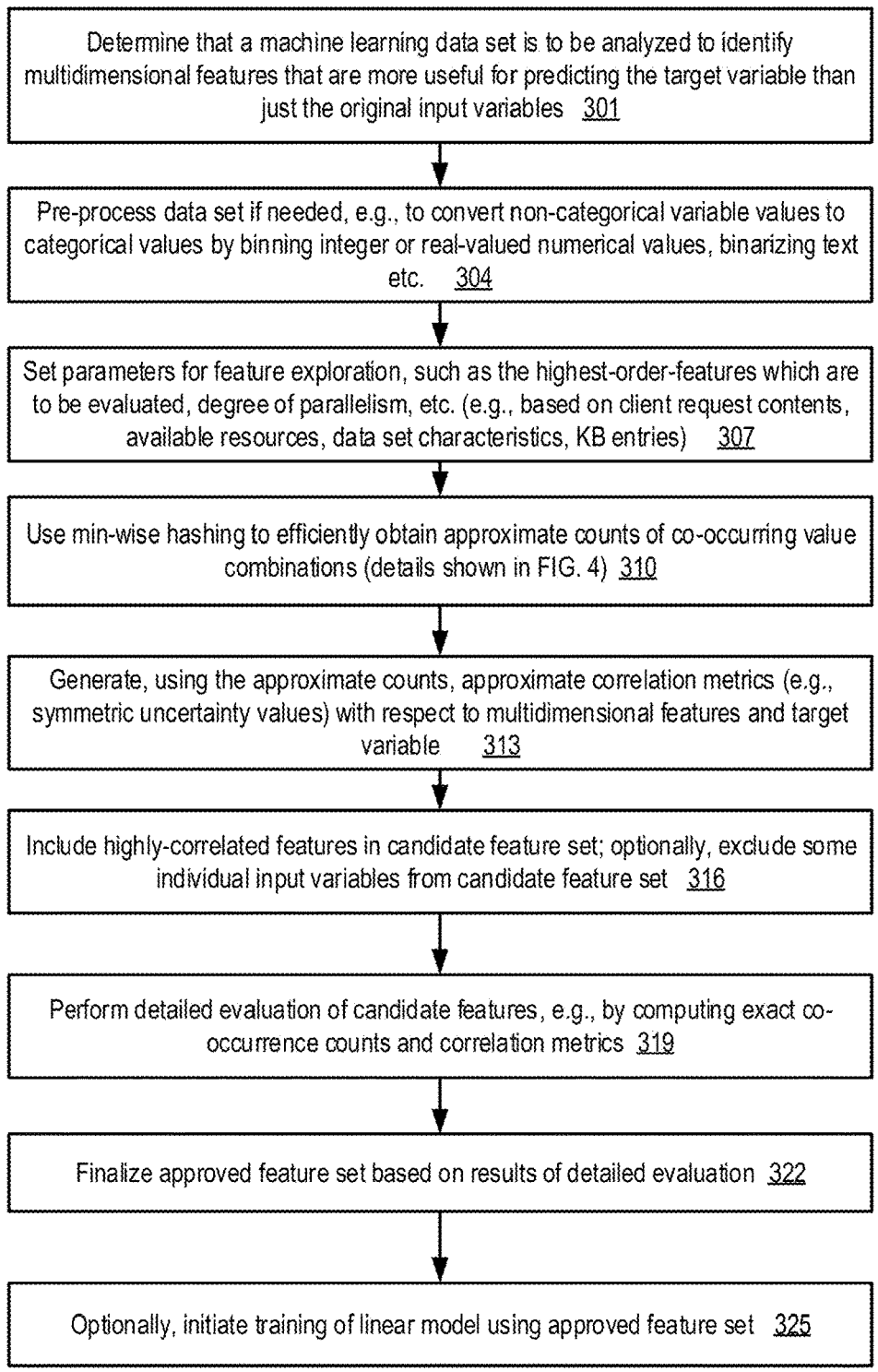
FIG. 3 is a flow diagram illustrating operations that may be performed to select high-order features for training a machine learning model, according to at least some embodiments.

FIG. 3 is a flow diagram illustrating operations that may be performed to select high-order features for training a machine learning model, according to at least some embodiments. As shown in element 301, a determination may be made that an effort is to be undertaken to identify multidimensional features that have high predictive utility for a target variable of a data set than the original input variables (single-dimensional features). Such a determination may be made for any of a number of reasons in different embodiments—for example, because a client of a machine learning service submits a feature exploration request via a programmatic interface and indicates that a search for useful multi-dimensional features should be performed, or because an initial examination of at least a portion of the data set indicates that such a search may be advisable, or based on knowledge base entries indicative of prior experience with model training for similar data sets, and so on.

Depending on the characteristics of the raw input data, it may have to be pre-processed as shown in element 304 in some embodiments before the min-wise hashing approach can be applied. For example, non-categorical integer or real numeric variables (including potentially the target variable) may be binned, text variables may be binarized, and so on. A number of feature exploration parameters may be selected, such as the highest order of the features for which analysis is to be performed (e.g., whether only quadratic or two-variable combination features are to be considered, three-variable features are to be considered, four-variable features are to be considered etc.), the degree and manner or parallelism to be employed during various phases of the computations, and the like. Further details regarding parallel approaches which may be employed in various embodiments are provided below in the context of FIG. 10 and FIG. 11. Some parameters may be specified via programmatic interfaces by clients in at least one embodiment. Other parameters may be selected in some embodiments, for example, based on the availability or computing capacity of execution platforms at a machine learning service at which the exploration is to be performed, or based on the budget/resource limits of the service or the client.

Figure 4:
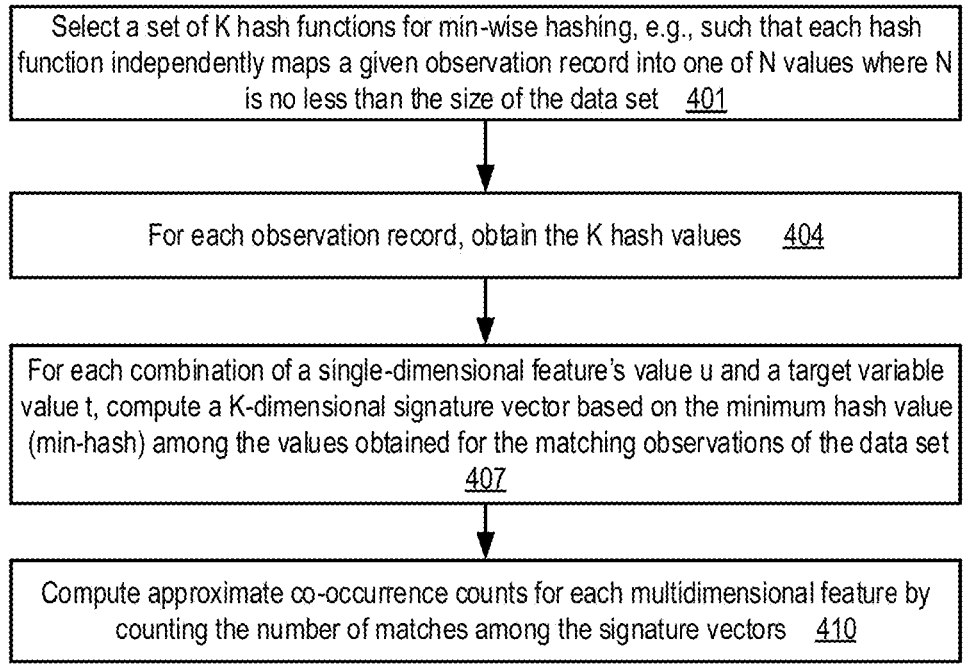
FIG. 4 is a flow diagram illustrating operations that may be performed to generate approximate co-occurrence counts for a data set using min-wise hashing, according to at least some embodiments.

Min-wise hashing may then be used to obtain approximate counts of various co-occurring value combinations of the multidimensional features to be considered (element 310) in the depicted embodiment. Details of the calculations associated with min-wise hashing are shown in FIG. 4 and discussed below. Using the approximate counts, approximate correlation metrics (e.g., symmetric uncertainty metrics) may be obtained for the various multidimensional features with respect to the target variable (element 313). Using the approximate correlation metrics, a set of candidate features which may have higher predictive usefulness than the other features may be selected (element 316)—e.g., only those features which meet a first correlation threshold may be retained as candidates, while other features may be rejected. In some cases, one or more unidimensional features or input variables may be rejected at this stage. In at least some cases, for large data sets, the size of the candidate set of features may be substantially smaller than the exhaustive list of possible features.

A detailed evaluation of the candidate features may then be performed (e.g., by obtaining exact co-occurrence counts and exact correlation metrics) (element 319). Those features which meet a second threshold criterion may be retained in a finalized or approved feature set (element 322). The approved feature set may optionally be used to train a model (e.g., a linear model) to predict values of the target variable (element 325) using any desired training algorithm.

FIG. 4 is a flow diagram illustrating operations that may be performed to generate approximate co-occurrence counts for a data set using min-wise hashing, according to at least some embodiments. With respect to quadratic features, the operations illustrated in FIG. 4 may correspond to those discussed above regarding GetCandidateQuads. As shown in element 401, a set of K hash functions may be identified in the depicted embodiment, such that each of the K hash functions can be used to independently map each observation record of a data set into a range of values whose size (i.e., the number of different mapping output results) is no smaller than the size of the data set. In at least some implementations, the accuracy of the estimates produced using the min-wise hashing approach may generally increase with K. Any of a number of factors may be used to select K (and/or the specific hash functions used) in different embodiment—e.g., K may be selected based on a maximum error threshold or error level for the estimates, the processing and computing capacities of execution platforms available, a client's preference expressed via a programmatic feature exploration request, and so on.

The K hash functions may be applied to each of the observation records of the data set (element 404). With respect to each combination of a single-dimensional feature's values and the values of the target variable, a K-dimensional signature vector derived from the minimum value among the hash outputs for that combination may be obtained (element 407). The approximate co-occurrence counts (i.e., the counts of the populations of respective subsets of the data set which meet co-occurrence criteria for the different possible combinations of variable values) for multidimensional features of interest may then be derived, e.g., using the kinds of equations discussed above in the context of GetCandidateQuads (element 410). It is noted that the signatures may be derived in a single pass through the data set in at least some embodiments. Once the signatures are obtained, the approximate co-occurrence counts may be obtained efficiently by counting matching elements among the K-dimensional vectors used for the signatures, instead of having to deal with the potentially very large number of observation records themselves. As discussed below, the calculations associated with the signature generation may be performed in parallel in some embodiments, e.g., on respective horizontal or vertical partitions of the data set. Similarly, as also discussed below, the computations of the approximate co-occurrence counts and/or the approximate correlation metrics may also be performed in parallel in some embodiments.

As mentioned above, variations on the K-hash-function-based algorithm indicated in FIG. 4 may be used to identify candidate feature sets in some embodiments. Such variations may include b-bit min-wise hashing, locality sensitive hashing, or an algorithm in which a single hash function is applied to each record instead of applying K different hash functions.

Example Data Set and Feature Selection Computations

FIG. 5, FIG. 6, FIG. 7, FIG. 8 and FIG. 9 collectively provide a concrete example of using the min-wise hashing-based feature processing algorithm discussed above for a tiny data set. A very small data set was selected deliberately, so that the main concepts of the approach may be illustrated while avoiding clutter; as mentioned earlier, at least some real-world data sets are likely to be orders of magnitude larger. FIG. 5 illustrates a simple example data set for which a min-wise hashing-based approach towards feature selection may be employed, according to at least some embodiments. Table 502 comprises 15 observation records with record identifiers (indicated in the column OR-ID) 1 through 15. Each observation record comprises values of three input categorical variables (labeled Highest-Degree, Major and Age respectively) and one categorical target variable 520 (Salary level, abbreviated simply as Salary). The data set is to be used to train a model which predicts the target variable on the basis of some combination of the input variables.

Legend table 530 indicates the meanings of the labels used in table 502. The Highest-Degree variable indicates the highest educational degree received by an individual represented by the observation record. Three possible highest degrees are considered: P (PhD or doctor of philosophy), M (Master's), and B (Bachelor's). The Major variable indicates the subject in which the highest degree was obtained. Three choices for the Major are shown in the example data set: Co (for Computer Science), Bu (for Business) and Hi (for History). The Age variable has just two categories or classes: LE30 (indicating that the individual is less than or equal to 30 years old) and GT30 (indicating that the individual is more than 30 years old). The Salary target variable also has two classes/categories: LE100K (less than or equal to 100,000 units of some currency) and GT100K (greater than or equal to 100,000 units of that currency). Thus, for example, the observation with identifier 6 indicates that one particular individual with a PhD in computer Science, whose is no older than 30 years old, has a salary of less than 100,000 units of the currency. The choices available for the different variables of the example (and the variables themselves) are selected entirely for illustrative purposes, and are not intended to represent any particular real-world scenario.

From the input variables or single-dimensional features, a number of multidimensional features can be generated by combination. FIG. 6 illustrates examples of derived quadratic features for the simple example data set, according to at least some embodiments. In Table 602, three quadratic features (obtained by combining two input variables each of the example data set of FIG. 5) are shown; the three-variable feature which could be generated by combining values of all three input variables is omitted from the subsequent discussion for simplicity.

The quadratic feature obtained by combining two features A and B is given the label "A_B" in FIG. 6. Thus, the derived quadratic features are labeled Highest-Degree_Major, Highest-Degree_Age, and Major_Age. The values of these features for the example observation with OR-ID 6, for example, are P_Bu (PhD combined with Business), P_LE30 (PhD combined with age less than or equal to 30), and Bu_LE30 (Business combined with age less than or equal to 30). In the depicted embodiment, feature exploration using min-wise hashing is to be used to determine whether it is worthwhile to include any of the derived features shown in FIG. 6 in a set of features to be used to train a model to predict values of the Salary variable, and if it is worthwhile to do so, which particular derived features should be included in the set.

Accordingly, a set of K hash functions may be selected for min-wise hashing. FIG. 7 illustrates example outputs of a plurality of hash functions with respect to observation records of the simple example data set, which may be used to compute approximate co-occurrence counts, according to at least some embodiments. In the example shown, K is set to 5, each of the hash functions maps a given observation record to a real value between 0 and 1.

The right-most five columns of Table 702, labeled Hash 1 through Hash 5, contain the outputs of each hash function for each observation record. These values may be obtained in operations corresponding to element 404 of FIG. 4. In general, any of a variety of hash functions (or pseudo-random-number based transformation functions which may not necessarily involve hashing as such) may be used in various embodiments; in some embodiments the functions may map the observation records to integers rather than real numbers. At least in some embodiments, the transformation functions may be selected such that the number of distinct values to which the records can be mapped by a given transformation function is no smaller than the number of observation records. In various embodiments, the ranges of the output values may be the same for all the hash functions—e.g., all K hash functions may map observation records to the integer range 1-1000 or (as in FIG. 7) to positive real numbers less than 1. For some sets of transformation functions relying on pseudo-random numbers, a unique seed value or other similar unique initialization metadata may be used for each of the functions. As mentioned earlier, the accuracy of the estimates used for feature selection may increase as K is increased in at least some embodiments, and as a result K may be selected based at least in part on a maximum error threshold.

From the hash values of table 702, K-dimensional signature vectors may be obtained for various combinations of individual single-dimensional features and the Salary target variable. FIG. 8 illustrates example signature vectors which may be generated for the quadratic features corresponding to respective values of a target variable of the simple example data set, according to at least some embodiments. Recall that the Salary target variable has only two possible values in our example: LE100K and GT100K. Table 802 shows the 5-dimensional signatures (Sig 1, Sig 2, Sig 3, Sig 4, Sig 5) corresponding to target variable value LE100K, while Table 803 shows the 5-dimensional signatures corresponding to GT100K.

Consider the derivation of the signature entry Sig 1 for the combination LE100K and Highest-Degree_B, the first value in the first row of Table 802. In table 702 of FIG. 7, there are six observation records in which the Highest-Degree variable has the value B and the Salary variable has the value LE100K. These are the observation records with identifiers 1, 2, 7, 8, 11 and 13. For this subset of records, the respective values generated by the first hash function Hash 1 are:
(OR-ID 1): 0.782997,
(OR-ID 2): 0.84197,
(OR-ID 7): 0.252912,
(OR-ID 8): 0.502927,
(OR-ID 11): 0.795695, and
(OR-ID 13): 0.97306.

The minimum among these six hash values is 0.252912. Hence, the Sig 1 entry for Highest-Degree_B and LE100K is set to 0.25912. Similarly, for all those combinations for which examples exist in the data set, respective min-hash values are found and stored in the entries of Tables 802 and 803. Of course, some combinations may not be present in the data set. For example, there happen to be no observations where the highest degree is M (Master's) and the salary is LE100K. The signatures for combinations which do not have any examples may be left blank, or set to N/A (not available) as shown in FIG. 8. The signatures shown in FIG. 8 may be computed in operations corresponding to element 407 of FIG. 4.

From the signatures of FIG. 8, approximate counts for the co-occurrence combinations may be obtained, e.g., with the help of equation E2.3 in operations corresponding to element 410 of FIG. 4. As the data set is very small, the exact co-occurrence counts are also easy to compute in this case. Using the respective types of co-occurrence counts, approximate and exact values for correlation metrics such as symmetric uncertainty may be calculated. FIG. 9 illustrates examples of approximate co-occurrence counts, actual co-occurrence counts, and correlation metrics derived from the co-occurrence counts for the simple example data set, according to at least some embodiments.

Table 902 shows the number of signature component matches for the combinations of the target variable and one quadratic feature—the combination of Highest-Degree and Major. For example, for GT100K, table 803 of FIG. 8 shows that Sig 4 (0.023505) and Sig 5 (0.096494) match in the rows for Highest-Degree_M and Major_Co. Because there are two matches, the entry for M_Co in Table 902 is set to 2. Other entries of table 902 are populated similarly.

Table 904 shows the approximate co-occurrence counts, which may be derived using Table 902 and equation E2.3 in operations corresponding to element 410 of FIG. 4. For comparison with Table 904, the actual co-occurrence counts for the Highest-Degree and Major combinations (obtained from the original data set) are shown in Table 906. Approximate symmetric uncertainty values (and actual symmetric uncertainty values) for the different quadratic features, computed using the equations for U and U' discussed earlier, are shown in Table 908. If, for example, a threshold symmetric uncertainty value of 0.75 were used to select the candidate quadratic features, only the features Highest-Degree_Major and Major_Age would be included as candidates, while Highest-Degree_Age may be discarded.

Parallelized Feature Selection

Figure 10:
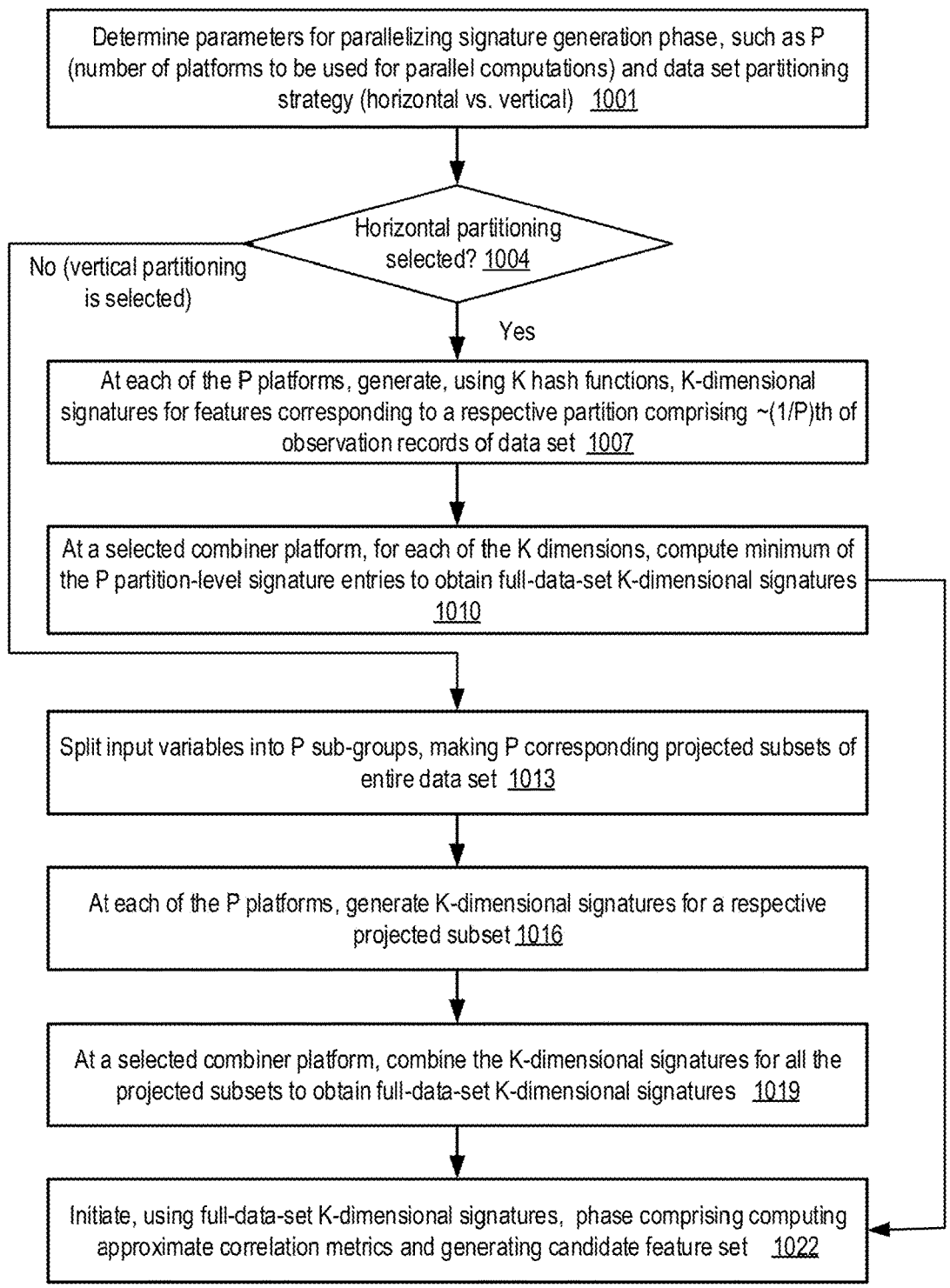
FIG. 10 is a flow diagram illustrates operations that may be performed to parallelize a signature generation phase of feature exploration with respect to a data set, according to at least some embodiments.

FIG. 10 is a flow diagram illustrates operations that may be performed to parallelize a signature generation phase of feature exploration with respect to a data set, according to at least some embodiments. As shown in element 1001, a set of parameters governing various aspects of the feature selection procedure for a data set may be determined. The parameters may include, for example, the degree of parallelism P (i.e., the number of distinct execution platforms) to be employed for signature generation, and the partitioning strategy to be used. In some embodiments, P execution platforms may be identified/selected for the parallelized signature generation phase from among a pool of execution platforms of a machine learning service, e.g., by a feature processing coordinator such as coordinator 130 of FIG. 1. In the depicted embodiment, the data set may be partitioned horizontally (in which case respective partitions may comprise respective subsets of complete observation records of the data set) or vertically (in which case respective partitions may comprise respective sub-groups or projections of input variables, with a given observation record being distributed among several different partitions). In at least some embodiments, combinations of vertical and horizontal partitioning may be used. Any of several factors may influence the partitioning strategy in different embodiments, such as the total number of observation records, the total number of input variables, the computing capacity of the set of execution platforms available, and so on.

If a horizontal partitioning strategy is selected (as detected in operations corresponding to element 1004), respective K-dimensional signatures may be generated using K selected hash functions for approximately (1/P)th total number of observation records at each of the execution platforms (element 1007). Each of the P platforms may compute min-hash signatures for its partition of observations. Then, as shown in element 1010, at a selected aggregator or combiner platform, the signatures from the P partitions may be combined, and the overall data-set-level min-hash signatures may be computed in the depicted embodiment, e.g., by setting a given element of the overall data-set-level min-hash signature to the minimum of the minimums indicated in the corresponding element of the P partition-level signatures. In some embodiments, a separate execution platform may be used for the combining of the signatures than was used for any of the partitions, while in other embodiments a platform that was used for one of the partitions may also be used as a combiner. The phase of calculating the approximate counts and approximate correlation metrics based on matching signatures may be initiated using the data-set-level signatures (element 1022).

If a vertical partitioning strategy is employed (as also detected in element 1004), the set of input variables may be partitioned into P projections or sub-groups of input variables (element 1013). At each of the P platforms to be used in parallel, K-dimensional signatures may be generated for the corresponding projection of input variables (element 1016) in parallel. The projection-level signatures may then be combined (element 1019), e.g., at a selected combiner platform which may or may not be one of the platforms used for the projections. In the case of vertical partitioning, no additional computations of minimums from the per-partition minimums may be required, as each of the partitions already covers respective sets of input variable values for all the observations. As in the case of horizontal partitioning, once the data-set-level signatures have been obtained, the phase of calculating the approximate counts and approximate correlation metrics based on matching signatures may be initiated (element 1022). It is noted that depending on the transformation or hash functions used, all the P platforms may have to use the same set of initialization parameters (e.g., seeds) in some implementations of the signature-level parallelization approaches shown in FIG. 10.

Figure 11:
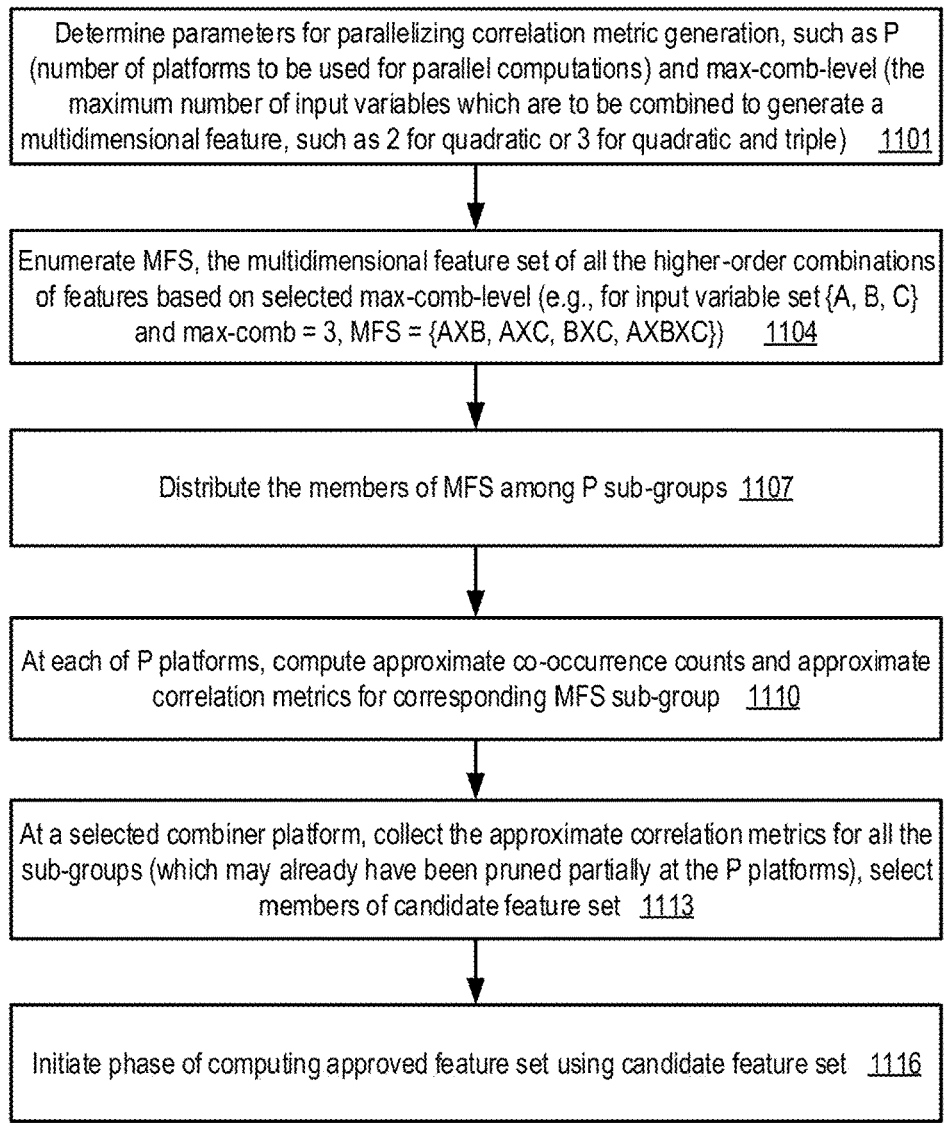
FIG. 11 is a flow diagram illustrates operations that may be performed to parallelize a correlation computation and feature pruning phase of feature exploration with respect to a data set, according to at least some embodiments.

In some embodiments, instead of or in addition to parallelizing the signature generation phase as in FIG. 10, the operations for correlation calculations and/or feature pruning may be parallelized. FIG. 11 is a flow diagram illustrates operations that may be performed to parallelize a correlation computation and feature pruning phase of feature exploration with respect to a data set, according to at least some embodiments. As shown in element 1101, the parameters for parallelizing this second phase of operations may be selected for a given data set. The parameters identified may include, for example, the degree of parallelism P, and "max-comb-level" (the highest combinational dimensionality or order of the features to be evaluated—e.g., whether only quadratic features are to be considered, 3-variable features as well as quadratic features are to be considered, and so on). The multidimensional feature set MFS comprising all the combinations may then be enumerated (element 1104). For example, for max-comb-level of 3 and unidimensional features A, B, and C, the MFS may comprise A×B, A×C, B×C and B×C×D. In some embodiments, the P execution platforms may be identified for the parallelized correlation computations from among a pool of execution platforms of a machine learning service, e.g., by a feature processing coordinator such as coordinator 130 of FIG. 1.

The members of MFS may then be distributed into P sub-groups (element 1107). The signatures corresponding to the different sub-groups may be made accessible to respective execution platforms of the P execution platforms. The approximate co-occurrence counts may be computed for each sub-group at each platform (element 1110). The approximate correlation metrics may be collected at a combiner platform (element 1113) (which may be one of the platforms used for a sub-group, or a different platform selected for centralized operations), and a set of candidate features may then be selected based on the overall ranking of the approximate correlation metrics. In some cases, the P platforms may prune their own list of features before providing them for the combination step of element 1113. Once the candidate feature set has been obtained, the phase of identifying the members of the approved or final feature set (which may also be performed in parallel) may be initiated (element 1116) in the depicted embodiment. In some embodiments, parallelism may be used at both the signature generation phase (as illustrated in FIG. 10) and the candidate feature identification phase (FIG. 11)—in fact, at least some of the same set of platforms may be used for both phases.

It is noted that in various embodiments, at least some operations other than those illustrated in the flow diagrams of FIG. 3, FIG. 4, FIG. 10 and FIG. 11 may be used to implement the min-wise hashing-based feature selection and generation techniques described above. Some of the operations shown may not be implemented in some embodiments or may be implemented in a different order, or in parallel rather than sequentially.

Use Cases

The techniques described above, of obtaining approximate co-occurrence counts for feasible multidimensional data set features, and using the approximate counts to prune a feature set, may be useful in a variety of embodiments. Many data sets used for various machine learning problems may comprise millions of observations, with each observation comprising tens, hundreds or even thousands of individual input variables. In some cases, the input variables may have complex non-linear relationships with the target variable whose values are to be predicted using a model. Performing an exhaustive exact correlation analysis of all possible pairs, triples, quadruples and other combinations of input variables and the target may be computationally intractable. Using signatures obtained efficiently with a selected set of hash functions, approximate correlation values may be determined at substantially lower cost than if an exact correlation analysis had to be performed. The models trained using a feature set identified using the approximate analysis may be comparable or superior in predictive accuracy, and much lower in training costs, than models trained using at least some alternative approaches which utilize down-sampling or single-dimensional features.

Illustrative Computer System

Figure 12:
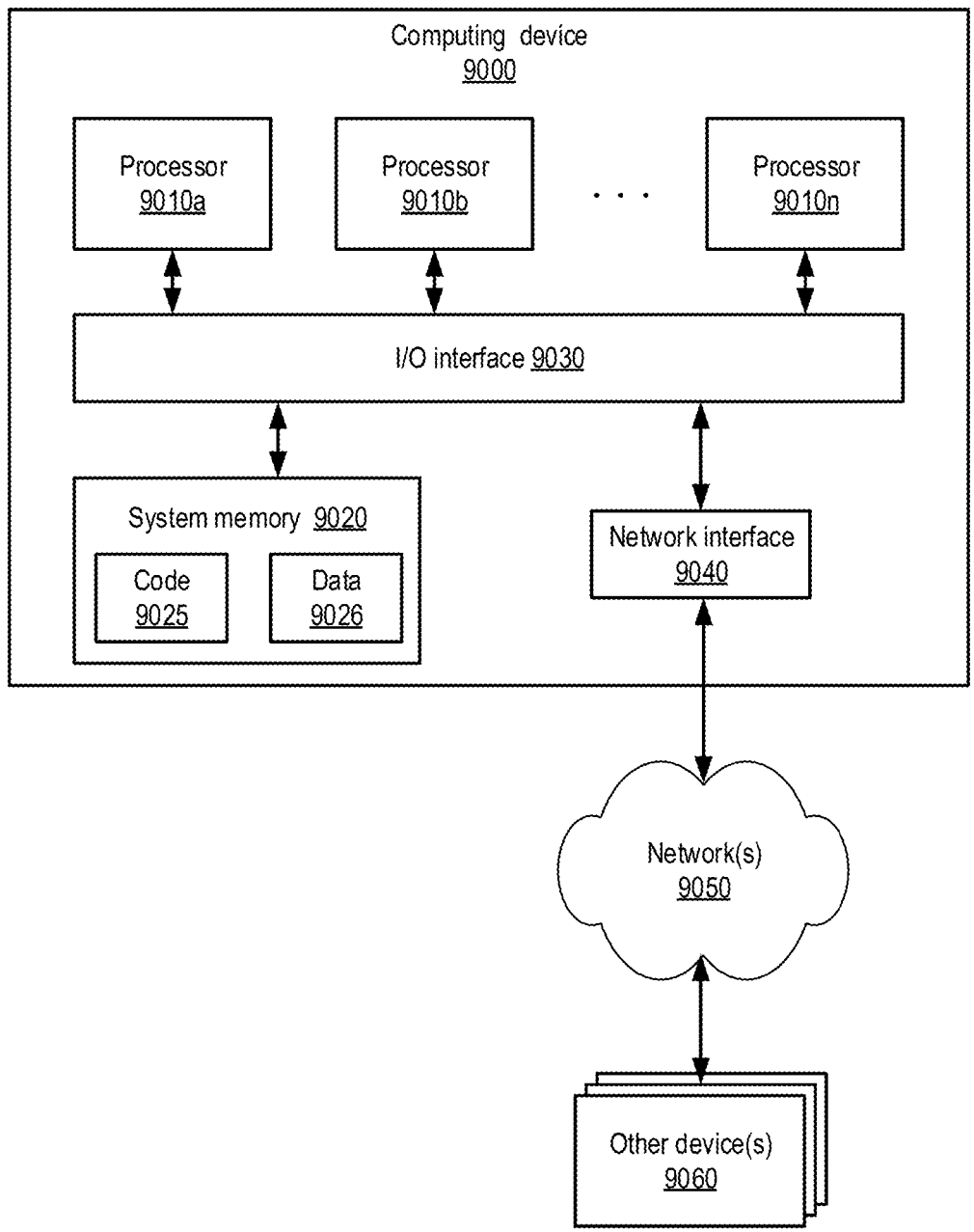
FIG. 12 is a block diagram illustrating an example computing device that may be used in at least some embodiments.

In at least some embodiments, a server that implements a portion or all of one or more of the technologies described herein, including the techniques to implement feature selection and generation using min-wise hashing, various components of a machine learning service including feature processing managers, model training/testing managers, execution platforms and the like may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a machine learning service of a provider network;
wherein the one or more computing devices are configured to:
generate a set of multidimensional features from a plurality of input variables in a first data set of observation records, wherein the first data set is to be used to train a linear machine learning model to predict a target variable in the first data set based on a linear combination of values of individual selected input variables, and the set of multidimensional features includes a first multidimensional feature derived from a first input variable and a second input variable in the plurality of input variables in the first data set;
select a first set of execution platforms to execute an analysis to identify a first candidate feature set of the first data set for training the linear machine learning model, wherein an amount of execution platforms selected for the analysis is reduced based on use of an approximation technique to approximate correlation metrics of the multidimensional features;

execute the analysis using the set of execution platforms and the approximation technique to approximate a correlation metric between the first multidimensional feature and the target variable, including to:

generate, using min-wise hashing, a set of multidimensional signatures using one or more transformation functions applied to the first data set of observation records, wherein individual ones of the multidimensional signatures correspond to respective subsets of the observation records in the first data set having respective combinations of values for one of the input variables and the target variable;

determine an approximate count of a population of observation records of the first data set having a same combination of values, including (a) a first value for the first input variable, (b) a second value for the second input variable, and (c) a third value of the target variable, wherein the approximate count is determined based at least in part on a number of matching signature components in a first multidimensional signature generated for observation records having the first value for the first input variable and a second multidimensional signature generated for observation records having the second value for the second input variable; and generate, based at least in part on the approximate count of the population, an approximate value of the correlation metric between the first multidimensional feature and the target variable;

include, based at least in part on determining that the approximate value of the correlation metric meets a first threshold criterion, the first multidimensional feature in the first candidate feature set for training the linear machine learning model;

determine, with respect to the first multidimensional feature included in the first candidate feature set, an exact value of the correlation metric between the first multidimensional feature and the target variable;

based at least in part on determining that the exact value of the correlation metric meets a second threshold criterion, initiate training of the linear machine learning model using a final feature set which includes the first multidimensional feature; and after the training of the linear machine learning model using the final feature set:

determine that a prediction accuracy of the linear machine learning model does not meet a prediction accuracy criterion;

perform a second analysis of the first data set using the approximation technique to identify a second candidate feature set that is different from the first candidate feature set and includes one or more multidimensional features but does not include the first multidimensional feature; and retrain the linear machine learning model using the second candidate feature set.

2. The system as recited in claim 1, wherein the one or more computing devices are configured to:

determine that, with respect to a second data set, a preparation of a third candidate feature set is to include a calculation of a second approximate correlation metric between (a) a particular multidimensional feature of the second data set and (b) a target variable of the second data set, wherein the particular multidimensional feature is derived from a combination of at least three input variables of the second data set; and obtain the second approximate correlation metric based at least in part on an approximate co-occurrence count obtained using min-wise hashing for a quadratic feature of the second data set, wherein the quadratic feature is derived at least in part from (a) a first input variable of the at least three input variables and (b) a second input variable of the at least three input variables.

3. The system as recited in claim 1, wherein the one or more computing devices are configured to:

determine that, with respect to a second data set, a second set of execution platforms are to be employed to compute multidimensional signatures of observation records of the second data set for min-wise hashing;

subdivide the second data set into a plurality of partitions;

initiate a determination of a first multidimensional signature corresponding to at least a portion of a first partition of the plurality of partitions at a first execution platform of the second set of execution platforms; and initiate a determination of a second multidimensional signature corresponding to at least a portion of a second partition of the plurality of partitions at a second execution platform of the second set of execution platforms.

4. The system as recited in claim 1, wherein the one or more computing devices are configured to:

identify, with respect to a second data set, a plurality of features for which respective approximate correlation metrics are to be determined with respect to a target variable of the second data set;

initiate a first determination of a first approximate correlation metric of a first feature of the plurality of features at a first execution platform of a second set of execution platforms, wherein the first determination is based at least in part on a multidimensional signature obtained using min-wise hashing from at least a first portion of the second data set; and initiate a second determination of a second approximate correlation metric of a second feature of the plurality of features at a second execution platform of the second set of execution platforms.

5. The system as recited in claim 1, wherein the one or more computing devices are configured to:

select a particular number of hash functions to be used for the min-wise hashing based at least on part on one or more of: (a) an error threshold associated with the approximate count or (b) an indication of resource capacity available on the first set of execution platforms for the min-wise hashing.

6. A method, comprising:

performing, by one or more computing devices:

generating a set of higher-order features from a plurality of input variables in a first data set of observation records, wherein the first data set is to be used to train a linear machine learning model to predict a target variable in the first data set based on a linear combination of values of individual selected input variables, and the set of higher-order features includes a first higher-order feature derived from a first input variable and a second input variable in the plurality of input variables in the first data set;

selecting a set of execution platforms to execute an analysis to identify a first candidate feature set of the first data set for training the linear machine learning model, wherein an amount of execution platforms selected for the analysis is reduced based on use of an approximation technique to approximate correlation metrics of the higher-order features;

executing the analysis using the set of execution platforms and the approximation technique to approximate a correlation metric between the first higher-order feature and the target variable, including:

generating, using min-wise hashing, a set of multidimensional signatures using one or more transformation functions applied to the first data set of observation records, wherein individual ones of the multidimensional signatures correspond to respective subsets of the observation records in the first data set having respective combinations of values for one of the input variables and the target variable;

determining an approximate count of a population of observation records of the first data set having a same combination of values, including (a) a first value of the first input variable, (b) a second value of the second input variable, and (c) a third value of the target variable, wherein the approximate count is determined based at least in part on a number of matching signature components in a first multidimensional signature generated for observation records having the first value for the first input variable and a second multidimensional signature generated for observation records having the second value for the second input variable; and obtaining, based at least in part on the approximate count of the population, an approximate value of the correlation metric between the first higher-order feature and the target variable;

including, based at least in part on determining that the approximate value of the correlation metric meets a first threshold criterion, the first higher-order feature in the first candidate feature set to be used to train the linear machine learning model;

determining, with respect to the first higher-order feature included in the first candidate feature set, an exact value of the correlation metric between the first higher-order feature and the target variable;

based at least in part on determining that the exact value of the correlation metric meets a second threshold criterion, determining to use the first higher-order feature to train the linear machine learning model;

initiating a training of the linear machine learning model using a final feature set that includes at least some features of the first candidate feature set, including the first higher-order feature; and after the training of the linear machine learning model using the final feature set:

determining that a prediction accuracy of the linear machine learning model does not meet a prediction accuracy criterion;

performing a second analysis of the first data set using the approximation technique to identify a second candidate feature set that is different from the first candidate feature set and includes one or more higher-order features but does not include the first higher-order feature; and retraining the linear machine learning model using the second candidate feature set.

7. The method as recited in claim 6, wherein generating, using min-wise hashing, the set of multidimensional signatures comprises:

selecting a plurality of hash functions, wherein an individual one of the plurality of hash functions, when provided a particular observation record of the first data set as input, produces an output within a set of distinct values, wherein a size of the set of distinct values is no smaller than the number of observations of the first data set; and providing, as input to individual ones of the plurality of hash functions, individual ones of the observation records of the first data set.

8. The method as recited in claim 7, wherein generating, using min-wise hashing, the set of multidimensional signatures comprises:

determining a first minimum output value from among the outputs produced by the plurality of hash functions with respect to a first set of observation records, wherein individual ones of the observation records of the first set comprise the first value of the first input variable and the third value of the target variable; and determining a second minimum output value from among the outputs produced by the plurality of hash functions with respect to a second set of observation records, wherein individual ones of the observation records of the second set comprise the second value of the second input variable and the third value of the target variable.

9. The method as recited in claim 6, wherein the correlation metric comprises one or more of: (a) a symmetric uncertainty metric, (b) a mutual information metric, (c) a Gini coefficient metric or (d) an information gain metric.

10. The method as recited in claim 6, wherein the plurality of input variables comprise a third input variable, further comprising performing, by the one or more computing devices:

determining an approximate count of the population of a second subset of matching observation records of the first data set, wherein individual ones of the observation records of the second subset comprise (a) the first value of the first input variable, (b) the second value of the second input variable, (c) a particular value of a third input variable, and (d) the third value of the target variable;

obtaining, based at least in part on the approximate count of the population of the second subset, a second value of the correlation metric between a second higher-order feature and the target variable, wherein the second higher-order feature is derived from at least the first input variable, the second input variable and the third input variable; and including, based at least in part on determining that the second value of the correlation metric meets a particular threshold criterion, the second higher-order feature in the first candidate feature set.

11. The method as recited in claim 6, further comprising performing, by the one or more computing devices:

identifying a first execution platform of a second set of execution platforms of a machine learning service at which results of at least a subset of the one or more transformation functions are to be obtained with respect to a first partition of a second data set;

identifying a second execution platform of the second set of execution platforms at which results of at least a subset of the one or more transformation functions are to be obtained with respect to a second partition of the second data set; and causing results of at least the respective subsets of the one or more transformation functions from the first and second execution platforms to be combined to determine a third candidate feature set to be used to train a second machine learning model corresponding to the second data set.

12. The method as recited in claim 6, further comprising performing, by the one or more computing devices:

receiving, from a client of a machine learning service, a feature exploration request indicating one or more of (a) a maximum number of individual features to be combined to form higher-order features for training a second machine learning model using a second data set or (b) a resource budget associated with generating higher-order features; and determining, based at least in part on the feature exploration request, that an analysis with respect to a particular higher-order feature is not to be performed.

13. The method as recited in claim 6, further comprising performing, by the one or more computing devices:

determining, based at least in part on examining a subset of a second data set, that a particular non-categorical variable included in the second data set is to be mapped to a categorical variable prior to a generation of a third candidate feature set comprising a higher-order feature of the second data set; and initiating the mapping of the particular non-categorical variable to the categorical variable, wherein the mapping includes one or more of (a) binning of a numeric input variable (b) binarizing a text input variable or (c) binning of a numeric target variable.

14. A non-transitory computer-accessible storage medium storing program instructions that when executed on one or more processors cause the one or more processors to:

generate a set of higher-order features from a plurality of input variables in a first data set of observation records, wherein the first data set is to be used to train a linear machine learning model to predict a target variable in the first data set based on a linear combination of values of individual selected input variables, and the set of higher-order features includes a first higher-order feature derived from a first input variable and a second input variable in the plurality of input variables in the first data set;

select a set of execution platforms to execute an analysis to identify a first candidate feature set of the first data set for training the linear machine learning model, wherein an amount of execution platforms selected for the analysis is reduced based on use of an approximation technique to approximate correlation metrics of the higher-order features;

execute the analysis using the set of execution platforms and the approximation technique to approximate a correlation metric between the first higher-order feature and the target variable, including to:

generate, using min-wise hashing, a set of multidimensional signatures using one or more transformation functions applied to the first data set of observation records, wherein individual ones of the multidimensional signatures correspond to respective subsets of the observation records in the first data set having respective combinations of values for one of the input variables and the target variable;

determine an approximate count of a population of observation records of the first data set having a same combination of values, including (a) a first value of the first input variable, (b) a second value of the second input variable, and (c) a third value of the target variable, wherein the approximate count is determined based at least in part on a number of matching signature components in a first multidimensional signature generated for observation records having the first value for the first input variable and a second multidimensional signature generated for observation records having the second value for the second input variable; and obtain, based at least in part on the approximate count of the population of the first subset, an approximate value of the correlation metric between the first higher-order feature and the target variable;

include, based at least in part on determining that the approximate value of the correlation metric meets a first threshold criterion, the first higher-order feature in the first candidate feature set to be used to train the linear machine learning model;

determine, with respect to the first higher-order feature included in the first candidate feature set, an exact value of the correlation metric between the first higher-order feature and the target variable;

based at least in part on determining that the exact value of the correlation metric meets a second threshold criterion, determine to use the first higher-order feature to train the linear machine learning model;

initiate a training of the linear machine learning model using a final feature set that includes at least some features of the first candidate feature set, including the first higher-order feature; and after the training of the linear machine learning model using the final feature set:

determine that a prediction accuracy of the linear machine learning model does not meet a prediction accuracy criterion;

perform a second analysis of the first data set using the approximation technique to identify a second candidate feature set that is different from the first candidate feature set and includes one or more higher-order features but does not include the first higher-order feature; and retrain the linear machine learning model using the second candidate feature set.

15. The non-transitory computer-accessible storage medium as recited in claim 14, wherein to generate, using min-wise hashing, the set of multidimensional signatures, the instructions when executed on the one or more processors cause the one or more processors to:

select a plurality of hash functions, wherein an individual one of the plurality of hash functions, when provided a particular observation record of the first data set as input, produces an output within a set of distinct values, wherein a size of the set of distinct values is no smaller than the number of observations of the first data set; and provide, as input to individual ones of the plurality of hash functions, individual ones of the observation records of the first data set.

16. The non-transitory computer-accessible storage medium as recited in claim 15, wherein to generate, using min-wise hashing, the set of multidimensional signatures, the instructions when executed on the one or more processors cause the one or more processors to:

determine a first minimum output value from among the outputs produced by the plurality of hash functions with respect to a first set of observation records, wherein individual ones of the observation records of the first set comprise the first value of the first input variable and the third value of the target variable; and determine a second minimum output value from among the outputs produced by the plurality of hash functions with respect to a second set of observation records, wherein individual ones of the observation records of the second set comprise the second value of the second input variable and the third value of the target variable.

17. The non-transitory computer-accessible storage medium as recited in claim 14, wherein the linear machine learning model comprises one of: (a) a binary classification model, (b) a multi-class classification model, or (c) a regression model.

18. The non-transitory computer-accessible storage medium as recited in claim 14, wherein to generate the set of multidimensional signatures, the instructions when executed at the one or more processors cause the one or more processors to utilize one or more of: (a) a b-bit min-wise hashing algorithm, (b) a locality sensitive hashing algorithm, or (c) an algorithm in which a min-hash signature is obtained using a single hash function and without employing a plurality of hash functions.

\* \* \* \* \*